(12) United States Patent
Paschalakis et al.

(10) Patent No.: US 8,306,334 B2
(45) Date of Patent: Nov. 6, 2012

(54) METHODS OF REPRESENTING AND ANALYSING IMAGES

(75) Inventors: Stavros Paschalakis, Surrey (GB);
Miroslaw Bober, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/880,725

(22) Filed: Sep. 13, 2010

(65) Prior Publication Data
US 2011/0033106 A1 Feb. 10, 2011

Related U.S. Application Data

(62) Division of application No. 11/231,803, filed on Sep. 22, 2005, now Pat. No. 7,813,552.

(30) Foreign Application Priority Data

Sep. 23, 2004 (GB) .................................. 0421217.1
Aug. 5, 2005 (EP) ..................................... 05254924

(51) Int. Cl.
*G06K 9/46* (2006.01)
*G06K 9/62* (2006.01)

(52) U.S. Cl. ........................................ 382/190; 382/165

(58) Field of Classification Search ........... 382/100–320
See application file for complete search history.

(56) References Cited

U.S. PATENT DOCUMENTS

| | | | | |
|---|---|---|---|---|
| 5,751,852 A * | 5/1998 | Marimont et al. | ............. | 382/180 |
| 5,799,098 A * | 8/1998 | Ort et al. | ................. | 382/125 |
| 5,809,179 A * | 9/1998 | Marimont et al. | ............. | 382/254 |
| 5,926,555 A * | 7/1999 | Ort et al. | ..................... | 382/124 |
| 6,014,461 A * | 1/2000 | Hennessey et al. | ........... | 382/195 |
| 6,081,612 A * | 6/2000 | Gutkowicz-Krusin et al. | ............. | 382/128 |
| 6,091,846 A * | 7/2000 | Lin et al. | ...................... | 382/145 |
| 6,246,787 B1 * | 6/2001 | Hennessey et al. | ........... | 382/141 |
| 6,256,409 B1 * | 7/2001 | Wang | ............................ | 382/170 |
| 6,275,304 B1 * | 8/2001 | Eschbach et al. | ............. | 358/1.9 |
| 6,445,834 B1 * | 9/2002 | Rising, III | ..................... | 382/305 |
| 6,477,269 B1 | 11/2002 | Brechner | | |
| 6,483,938 B1 * | 11/2002 | Hennessey et al. | ........... | 382/149 |
| 6,490,370 B1 * | 12/2002 | Krasinski et al. | ............. | 382/195 |
| 6,542,619 B1 | 4/2003 | Jafarkhani et al. | | |
| 6,608,925 B1 * | 8/2003 | Edge et al. | ..................... | 382/162 |

(Continued)

FOREIGN PATENT DOCUMENTS

CN 1167959 A 12/1997
(Continued)

OTHER PUBLICATIONS

"Text of ISO/IEC 15938-3/FCD Information Technology—Multimedia Content Description Interface—Part 3 Visual," ISO/IEC JTC1/SC29/WG11/N4062, Mar. 2001, pp. 1-93, XP001001412.

(Continued)

*Primary Examiner* — Manav Seth
(74) *Attorney, Agent, or Firm* — Birch, Stewart, Kolasch & Birch, LLP.

(57) ABSTRACT

A method of representing and analysing images comprises producing a plurality of descriptors of an image at one or more scales and for one or more color channels, said descriptors capturing color content and interrelation information within the regions, and associating the descriptors in a plurality of ways based on their characteristics such as scale, color channel, feature semantics, and region, and comparing such representations of images to assess the similarity of images.

18 Claims, 10 Drawing Sheets

U.S. PATENT DOCUMENTS

| | | | |
|---|---|---|---|
| 6,674,915 B1* | 1/2004 | Wang | 382/263 |
| 6,687,416 B2* | 2/2004 | Wang | 382/278 |
| 7,420,559 B2* | 9/2008 | Kokojima et al. | 345/427 |
| 7,636,094 B2* | 12/2009 | Cieplinski | 345/589 |
| 7,657,126 B2* | 2/2010 | Gokturk et al. | 382/305 |
| 7,813,552 B2* | 10/2010 | Paschalakis et al. | 382/190 |
| 7,826,661 B2* | 11/2010 | Cieplinski | 382/167 |
| 7,869,649 B2* | 1/2011 | Watanabe et al. | 382/162 |
| 2003/0020743 A1 | 1/2003 | Barbieri | |
| 2003/0091235 A1 | 5/2003 | Xiong | |
| 2003/0194126 A1 | 10/2003 | Shin et al. | |
| 2004/0091044 A1 | 5/2004 | Nakajima et al. | |
| 2004/0170325 A1 | 9/2004 | Eichhorn et al. | |

FOREIGN PATENT DOCUMENTS

| | | |
|---|---|---|
| CN | 1402853 A | 3/2003 |
| JP | 09-293082 A | 11/1997 |
| JP | 2004-62605 A | 2/2004 |
| WO | WO 00/67203 A1 | 11/2000 |

OTHER PUBLICATIONS

B.S. Manjunath et al., "Color and Texture Descriptors," IEEE Transactions on Circuits and Systems For Video Technology, vol. 11, No. 6, Jun. 2001, pp. 703-715, XP001059862.

Dailianas et al., "Comparison of Automatic Video Segmentation Algorithms," SPIE Integration Issues in Large Commercial Media Delivery Systems, vol. 2615, Oct. 1995, pp. 2-16.

Di Sciascio et al. (1999), "Content-based image retrieval over the Web using query by sketch and.relevance feedback", pp. 123-130.

F. Porikli, Institute of Electrical and Electronics Engineers, "Automatic Threshold Determination of Centroid-Linkage Region Growing by MPEG-7 Dominant Color Descriptors," Proceedings 2002 International Conference on Image Processing, ICIP 2002, Sep. 22-25, 2002, New York, NY, IEEE, US, vol. 2 of 3, Sep. 22, 2002 No. 793-796 XP010607443.

Jacobs et al., "Fast Multiresolution Image Querying," In Proceedings of 1995 ACM SIGGRAPH Conference, Los Angeles, Aug. 1995, pp. 277-286.

Laaksonen et al., (Dec. 1, 2000), "PicSOM-content based image retrievel with self-organizing maps", pp. 1199-1207.

Lienhart, Rainer, "Comparison of Automatic Shot Boundary Detection Algorithms," In Proceedings of Image and Video Processing VII 1999, Proc. SPIE 3656-29, Jan. 1999, pp. 290-301.

Morris, Mano, Computer System Architecture, 1993, Prentice Hall, 3 edition, p. 299.

Skodras, The JPEG 2000 still image compression standard, Sep. 2001, Signal Processing Magazine, IEEE vol. 18, Issue 5, Sep. 2001, pp. 36-58.

Veltkamp et al. (Oct. 28, 2002), "Content-based image retrieval systems: A survey", pp. 1-62.

Wang et al., (Jul. 27, 2003), "Image retrievel using block-based color distribution", pp. 445-450.

Zabih et al., "A Feature-Based Algorithm for Detecting and Classifying Scene Breaks," In Proceedings of 1995 3rd ACM International Conference on Multimedia, San Francisco, 1995, pp. 189-200.

Zhuang et al., "Efficient Multiresolution Scene Change Detection by Wavelet Transformation," Proc. ICCE'97, Jun. 1997, pp. 250-251.

* cited by examiner

METHODS OF REPRESENTING AND ANALYSING IMAGES

This application is a Divisional of co-pending application Ser. No. 11/231,803, filed on Sep. 22, 2005, the entire contents of which are hereby incorporated by reference and for which priority is claimed under 35 U.S.C. §120.

BACKGROUND TO THE INVENTION

The invention relates to a method and apparatus for representing an image, and a method and apparatus for assessing the similarity between images.

In Lienhart, R., "Comparison of Automatic Shot Boundary Detection Algorithms", *In Proceedings of Image and Video Processing VII* 1999, Proc. SPIE 3656-29, pp. 290-301, January 1999, a method is presented for the detection of shot transitions in a video sequence. For each frame in the sequence, a 3-dimensional histogram in the RGB colour space is created. The difference between consecutive frames in the sequence is then calculated as the difference between their respective histograms, calculated as the sum of absolute bin-wise differences. Shot transitions are then identified by searching for the distances which are above a predetermined fixed threshold. Thus, this method detects shot transitions based solely on spatially insensitive colour content information. Therefore, this method does not make use of the wealth of information that is present in the spatial arrangement and interrelations of colours.

In Zabih, R., Miller, J., Mai, K., "A Feature-Based Algorithm for Detecting and Classifying Scene Breaks", *In Proceedings of* 1995 $3^{rd}$ *ACM International Conference on Multimedia*, San Francisco, Calif. USA, pp. 189-200, 1995, a different method is presented for the detection of shot transitions in a video sequence. For each frame in the sequence, an edge map is calculated. The difference between consecutive frames in the sequence is then calculated based on the number of edges which are present in the first frame but not in the second and the number of edges which are present in the second frame but not in the first. Then, sharp peaks in the time series of this difference measure indicate the presence of a shot transition. Thus, this method detects shot transitions based solely on edge information, which is one type of spatial interrelation information. Although the rationale is correct, this method does not make use of the wealth of information that is present in the colour content of the frame. Furthermore, the edge map creation process is computationally expensive and is meant to reveal only the strongest colour discontinuities within the frame. Furthermore, the method is quite sensitive to motion. Thus, the authors suggest the use of an image registration technique to counteract this shortcoming, but such processes are computationally expensive.

In Dailianas, A., Allen, R. B., England, P., "Comparison of Automatic Video Segmentation Algorithms", *SPIE Integration Issues in Large Commercial Media Delivery Systems*, vol. 2615, pp. 2-16, October 1995, another method is presented for the detection of shot transitions in a video sequence. The difference between consecutive frames in the sequence is calculated as the sum of absolute pixel-wise differences. Shot transitions are then identified by searching for the distances which are above a predetermined fixed threshold. Thus, this method detects shot transitions based solely on spatially sensitive colour content information. Although the rationale is correct, this method does not make use of the wealth of information that is present in the spatial interrelations of colours. Furthermore, such a simple processing of the video results in high sensitivity to noise and motion. A motion compensation algorithm could address the motion sensitivity problem, but such processes are computationally expensive.

In Xiong, W., "Shot Boundary Detection", US 2003/0091235 A1, published 15 May, 2003, a method is presented for the detection of shot transitions based on the combination of different types of information. That method comprises calculating a block-based difference between two frames and, if it exceeds a fixed threshold, declaring a candidate shot transition. In this case, the shot transition is verified by requiring that colour and/or edge differences between the two frames also exceed fixed thresholds. For the calculation of the block-based difference, the frames are divided into blocks and block averages are calculated. Then, the difference between corresponding blocks is thresholded to determine if two blocks are similar or different, and the number of different blocks between two frames is thresholded to determine if two frames are similar or different. The colour difference is the sum of absolute bin-wise differences, while the edge difference uses edge histograms, capturing edge magnitude and direction information.

In Nakajima, Y., Sugano, M., Yanagihara, H., for KDDI CORPORATION (JP), "Picture Searching Apparatus", US 2004/0091044 A1, published 13 May, 2004, a method is presented for the detection of shot transitions based on (a) correlation between images, (b) correlation between subsampled images, (c) motion between images and (d) motion between subsampled images. There, the correlation between images and between subsampled images is measured as a pixel-wise difference or a histogram difference and the motion between images and between subsampled images is measured based on various motion vector differences.

In Jafarkhani, H., Shahraray, B., for AT&T CORP. (US), "Method for Analyzing Video", U.S. Pat. No. 6,542,619 B1, granted 1 Apr., 2003, a shot transition detection method is presented which comprises creating two one dimensional projections of a video frame, i.e. row and column projections, performing a wavelet transform on each projection and retaining only the high frequency components (i.e. the wavelet coefficients), and auto-correlating the high frequency components of each transform. For a series of video frames, a shot transition is indicated when the resultant auto-correlation coefficient time curves exhibit a predetermined maximum value. Thus, that method employs spatially sensitive colour content and interrelation information, provided by the wavelet transform, but that information relates not to frames but to frame projections, resulting is great information loss.

In Jacobs, C. E., Finkelstein, A., Salesin, D. H., "Fast Multiresolution Image Querying", *In Proceedings of* 1995 *ACM SIGGRAPH Conference*, Los Angeles Calif., USA, Aug. 9-11, pp. 277-286, 1995, a method for retrieving images similar to a given image is presented. With that method images are initially represented by their Haar wavelet decomposition. Then, this decomposition is truncated, i.e. only the scaling function coefficient (average intensity) and a very small number of the largest magnitude wavelet coefficients are retained. Then, the truncated decomposition is quantised, i.e. only the signs of the wavelet coefficients are retained. Thus, a single image descriptor is formed that characterises the image for the purposes of image retrieval.

In Zhuang, Z.-Y., Hsu, C.-T., Chen, H.-Y., Ouhyoung, M., Wu, J.-L., "Efficient Multiresolution Scene Change detection by Wavelet Transformation", *In Proceedings of* 1997 *IEEE International Conference on Consumer Electronics ICCE* '97, Taipei, Taiwan, Jun. 11-13, pp. 250-251, 1997, a method for the detection of shot transitions is proposed that proceeds to characterise video frames in the same manner described in "Fast Multiresolution Image Querying". The difference between the methods of "Fast Multiresolution Image Querying" and "Efficient Multiresolution Scene Change detection by Wavelet Transformation" is that with the method of the latter, the perimeter of frames is discarded and frames are reduced to only their central parts. Such an approach leads to great information loss and can result in false video segmentation and/or great over-segmentation when significant motion is present in the video.

A deficiency that is common with both the methods described above is the assumption that a wavelet decomposition can be efficiently truncated by retaining only a very small number of the largest magnitude coefficients. To put this in context, a multi-scale wavelet decomposition of an image plane starting at 128×128 pixels down to 2×2 pixels produces 16383 wavelet coefficients. As those skilled in the art know, truncating this series to a very small number of coefficients on the basis of magnitude, e.g. the 40 or 60 coefficients with the largest magnitude as the authors suggest, results in descriptors which are extremely susceptible to noise, susceptible to partial occlusions for image retrieval and for video segmentation, and susceptible to high video motion and intra-shot lighting effects for video segmentation, to name but a few problems. Quantising the truncated series by retaining only the signs amplifies the problem.

Another significant problem with these methods is that the semantic information attached to the coefficients of the Haar wavelet decomposition is not exploited. Such semantic information includes the particular colour information that a coefficient represents, e.g. R of RGB or Y of $YC_bC_r$, the particular image scale in which a coefficient exists, e.g. is it a coefficient at a high image scale capturing fine detail or a coefficient at a low image scale capturing coarse image information, and so on.

Here, methods for assessing the similarity between images are set out, for example for the retrieval of images from a set of images that are similar to a given image or for the detection of frame discontinuities, such as shot transitions or lighting and other effects, in digital video. The methods rely on the extraction of image descriptors capturing spatially sensitive colour content and interrelation information at one or more image scales and across one or more image channels, followed by the combination of the descriptors not in a single but in multiple descriptors distinguished by semantic content and the use of those descriptors in multiple decision frameworks that effectively exploit said semantic content. Thus, unlike the previous methods, it is possible to establish complex relations between images, for example establish that two images depict the same scene but one has a very significant occlusion, such as a person walking in from of the camera, or that two images depict the same scene but captured under different lighting conditions, or that two frames belong to the same shot but appear very different because of global lighting effects.

SUMMARY OF THE INVENTION

Aspects of the invention are set out in the accompanying claims.

According to one aspect of the invention, sub-descriptors capturing colour information and/or colour interrelation information about one or more regions of an image are associated on the basis of characteristics of said sub-descriptors (e.g. region, scale, colour, colour interrelation, colour channel etc) to form two or more descriptors.

A sub-descriptor may have elements which also capture colour and/or colour interrelation information. In that case, the sub-descriptor elements may also constitute sub-descriptors. For example, the four measurements LL, HL, LH and HH of an image region for a Haar wavelet transform together form a sub-descriptor for that image region. However, LL on its own or HH on its own are may also be considered as sub-descriptors in their own right.

The step of "associating the sub-descriptors" can involve splitting them into their constituent elements and grouping or associating said elements according to corresponding characteristics.

Embodiments of the invention are set out below with reference to the accompanying Figures in which:

FIG. 1 illustrates the block averaging resampling process for the Y channel according to an embodiment of the invention;

FIGS. 2 A-D illustrate the calculation of the descriptor for a scale in one embodiment of the invention;

FIGS. 3 A-D illustrate the calculation of the descriptor for a scale according to a further embodiment of the invention;

Figure 1:
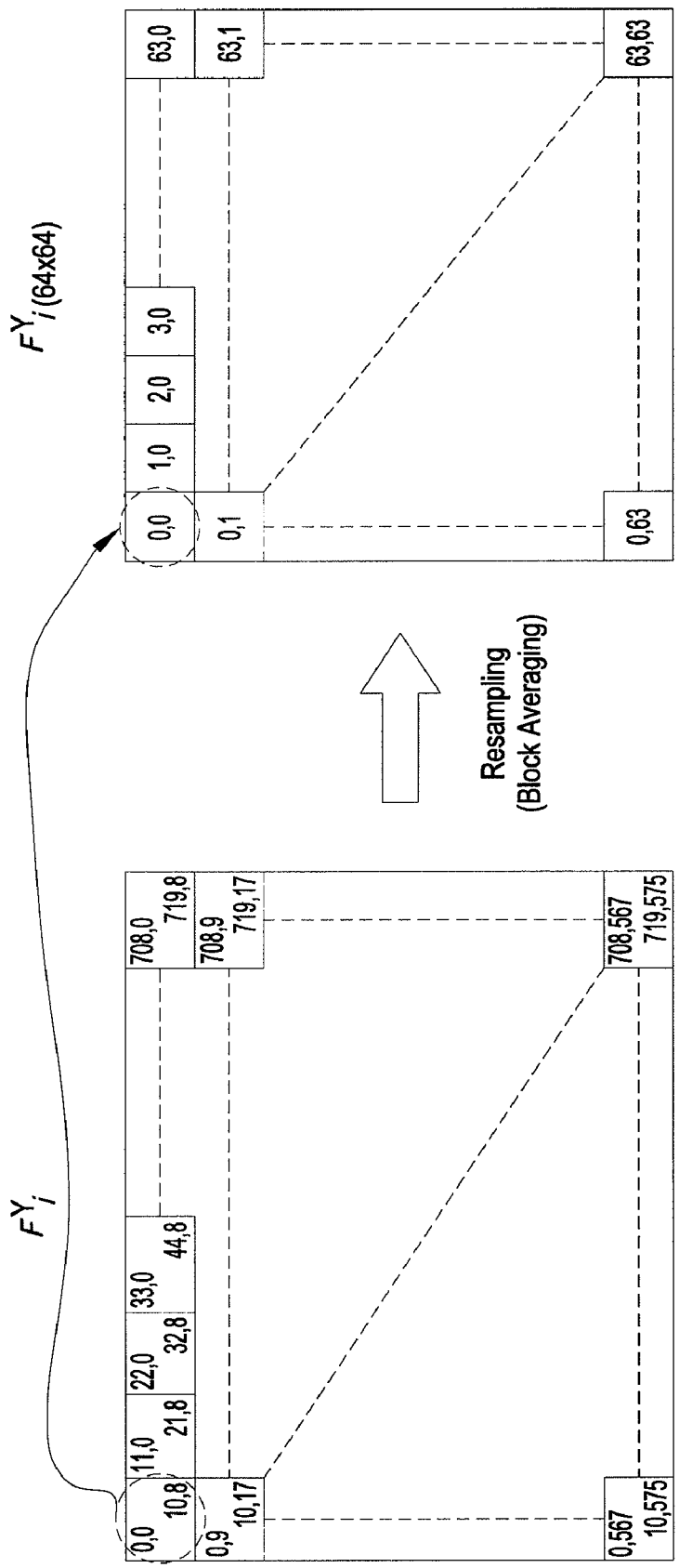

Consider a digital image $F_i(x,y)$ where $(x,y)$ represent spatial coordinates, with $x=0 \ldots M-1$ and $y=0 \ldots N-1$. In one embodiment of the invention, $F_i$ is represented in the colour space $YC_bC_r$, although this is not restrictive and embodiments of the invention are applicable to any colour space of any number of channels. In one embodiment of the invention, the spatial resolution of $F_i$ is 720×576 pixels, i.e. M=720 and N=576, although this is not restrictive and embodiments of the invention are applicable to any spatial resolution. In one embodiment of the invention, the highest resolution at which the descriptor is to be extracted is chosen to be 64×64 pixels, although this is not restrictive and embodiments of the invention are applicable to other resolutions. Thus, $F_i$ is resampled to give the 64×64 pixel image $F_{i(64 \times 64)}$. In one embodiment of the invention, this resampling process is a simple block averaging process as shown in FIG. 1, although the choice of the resampling mechanism is not restrictive. More specifically, FIG. 1 illustrates the block averaging resampling process for the Y channel, although this is not restrictive and the process can be used for any channel of any colour space. In another embodiment of the invention, the highest scale at which a descriptor is to be extracted coincides with the resolution of $F_i$ and no resampling is initially required.

Figures 2A, 2B, 2C, 2D:
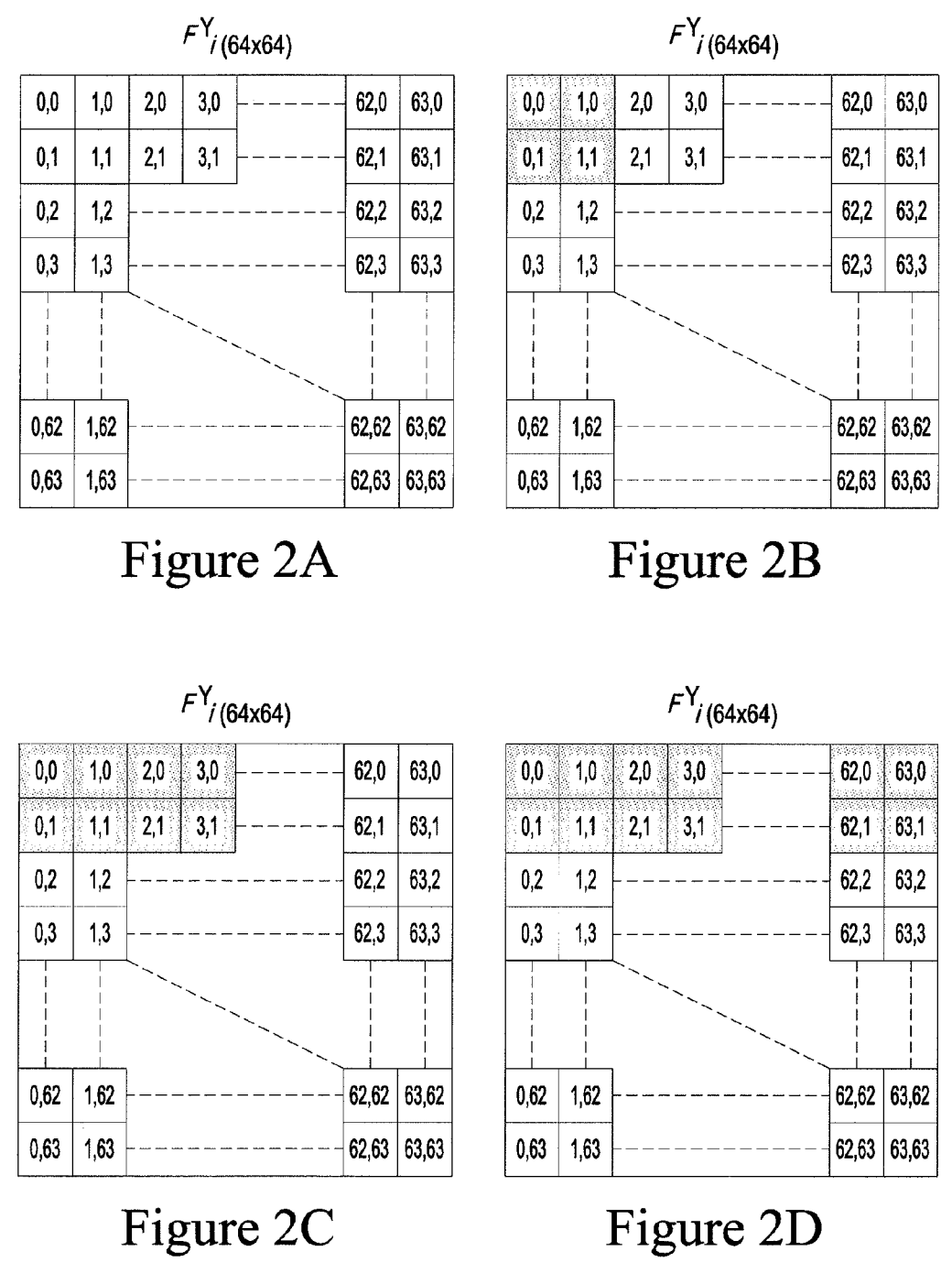

FIG. 2 illustrates the calculation of the descriptor for this scale in one embodiment of the invention. More specifically, FIG. 2 illustrates the calculation of the descriptor for the Y channel, although this is not restrictive and a similar approach is applied to all colour channels. In FIG. 2A a 2×2 window is applied to the top left corner of the image. This window specifies a local neighbourhood. For the pixels in this neighbourhood $F^Y_{i(64\times64)}(0,0)$, $F^Y_{i(64\times64)}(1,0)$, $F^Y_{i(64\times64)}(0,1)$ and $F^Y_{i(64\times64)}(1,1)$ the 2-dimensional Haar transform coefficients LL, HL, LH and HH can be calculated as $$LL=(F^Y_{i(64\times64)}(0,0)+F^Y_{i(64\times64)}(1,0)+F^Y_{i(64\times64)}(0,1)+F^Y_{i(64\times64)}(1,1))/2 \quad (1)$$

$$HL=(F^Y_{i(64\times64)}(0,0)-F^Y_{i(64\times64)}(1,0)+F^Y_{i(64\times64)}(0,1)-F^Y_{i(64\times64)}(1,1))/2 \quad (2)$$

$$LH=(F^Y_{i(64\times64)}(0,0)+F^Y_{i(64\times64)}(1,0)-F^Y_{i(64\times64)}(0,1)-F^Y_{i(64\times64)}(1,1))/2 \quad (3)$$

$$HH=(F^Y_{i(64\times64)}(0,0)-F^Y_{i(64\times64)}(1,0)-F^Y_{i(64\times64)}(0,1)+F^Y_{i(64\times64)}(1,1))/2 \quad (4)$$

In the equations above, LL captures colour content information and HL, LH and HH capture colour interrelation information. Those skilled in art will understand that the equations (1)-(4) may be modified to reduce the number of required calculations, for example by first performing calculations in the horizontal direction and then in the vertical direction. It is also common to calculate the Haar coefficients according to equations (1)-(4) or their optimisations thereof but with the value of 4 as a denominator instead of the value of 2.

Denoting $V^Y_{i(64\times64)}$ the descriptor of $F^Y_{i(64\times64)}$, these values are written into the descriptor as:

$$V^Y_{i(64\times64)}(1)=LL, V^Y_{i(64\times64)}(2), V^Y_{i(64\times64)}(3)=LH, V^Y_{i(64\times64)}(4)=HH \quad (5)$$

Next, as shown in FIG. 2B, the 2×2 window slides two pixels to the right to form a new neighbourhood comprising pixels $F^Y_{i(64\times64)}(2,0)$, $F^Y_{i(64\times64)}(3,0)$, $F^Y_{i(64\times64)}(2,1)$ and $F^Y_{i(64\times64)}(3,1)$. The Haar transform coefficients LL, HL, LH, and HH are again calculated for the new pixel values and then stored in the descriptor positions $V^Y_{i(64\times64)}(5)$ to $V^Y_{i(64\times64)}(8)$. As shown in FIGS. 2C and 2D once all the calculations for a set of rows are completed, the sliding window moves two pixels down and again starts sliding from left to right, until the entire image has been processed. This completes the calculation of the descriptor $V^Y_{i(64\times64)}$ which captures the image's spatially sensitive colour content and interrelations, for the Y plane at a scale of 64×64 pixels.

Figures 3A, 3B, 3C, 3D:
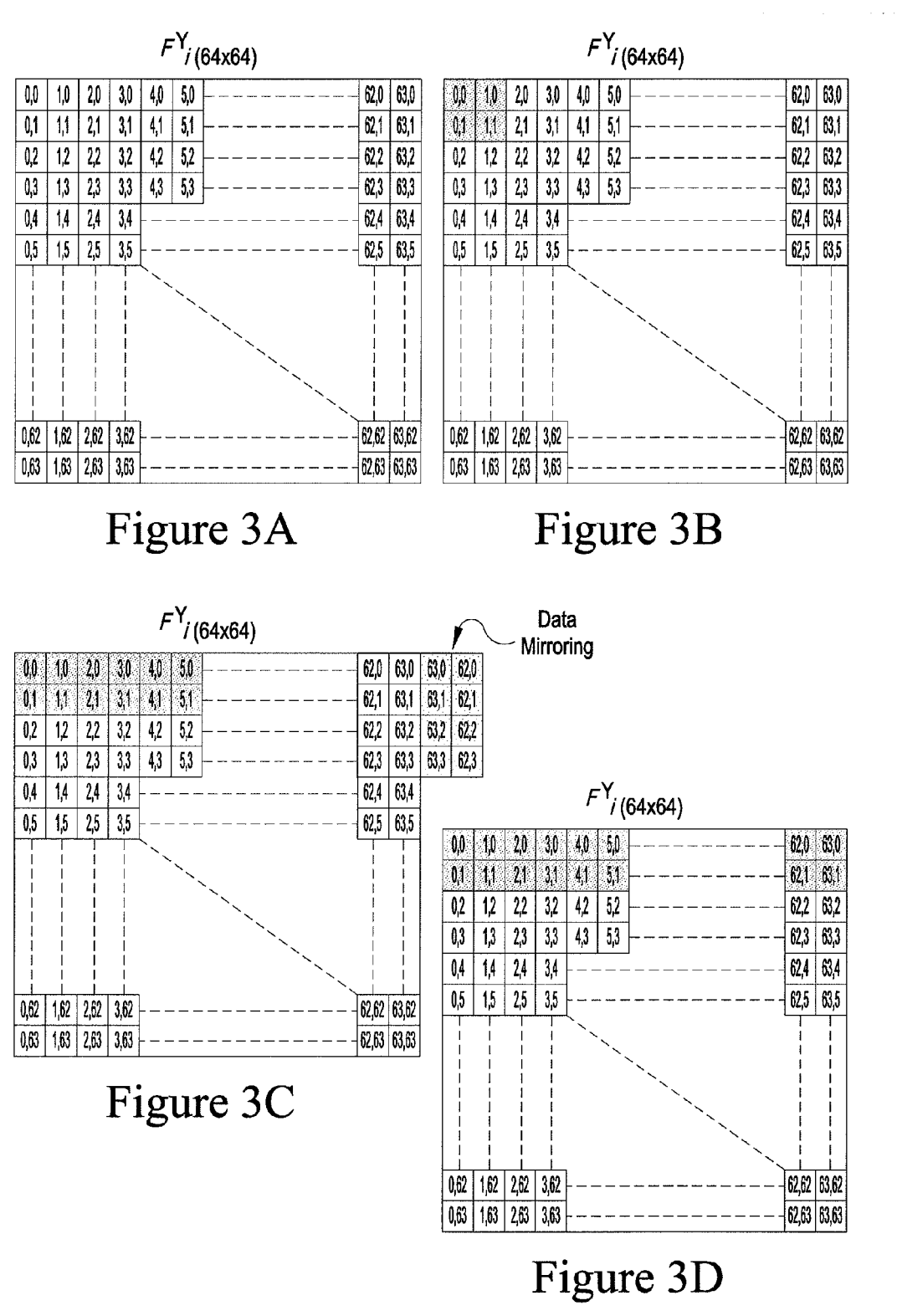

Embodiments of the invention relate to calculating descriptors that capture spatially sensitive colour content and interrelation information. Thus, In the above description, the equations (1)-(4) for LL, HL, LH and HH are just one example of what measurements one can make within a neighbourhood and representative of only one embodiment. The Haar transform is a simple example of a wavelet transform, which produces multi-resolution time-frequency representations of a signal. Another embodiment of the invention uses another similar, albeit more complex, wavelet transform instead of the Haar transform, namely the 2-dimensional Daubechies' wavelet transform. Unlike the previous transform, this transform operates in a 4×4 window with a sliding step of 2 pixels, i.e. the resultant neighbourhoods are overlapping. FIG. 3 illustrates this. In FIG. 3A a 4×4 window is applied to the top left corner of the image. This window specifies a local neighbourhood. For the pixels in this neighbourhood the following descriptor elements are calculated $$a_1 = h_0 \cdot (h_0 \cdot F^Y_{i(64\times64)}(0, 0) + h_1 \cdot F^Y_{i(64\times64)}(1, 0) + \quad (6)$$
$$h_2 \cdot F^Y_{i(64\times64)}(2, 0) + h_3 \cdot F^Y_{i(64\times64)}(3, 0)) +$$
$$h_1 \cdot (h_0 \cdot F^Y_{i(64\times64)}(0, 1) + h_1 \cdot F^Y_{i(64\times64)}(1, 1) +$$
$$h_2 \cdot F^Y_{i(64\times64)}(2, 1) + h_3 \cdot F^Y_{i(64\times64)}(3, 1)) +$$
$$h_2 \cdot (h_0 \cdot F^Y_{i(64\times64)}(0, 2) + h_1 \cdot F^Y_{i(64\times64)}(1, 2) +$$
$$h_2 \cdot F^Y_{i(64\times64)}(2, 2) + h_3 \cdot F^Y_{i(64\times64)}(3, 2)) +$$
$$h_3 \cdot (h_0 \cdot F^Y_{i(64\times64)}(0, 3) + h_1 \cdot F^Y_{i(64\times64)}(1, 3) +$$
$$h_2 \cdot F^Y_{i(64\times64)}(2, 3) + h_3 \cdot F^Y_{i(64\times64)}(3, 3))$$

$$a_2 = h_0 \cdot (h_3 \cdot F^Y_{i(64\times64)}(0, 0) - h_2 \cdot F^Y_{i(64\times64)}(1, 0) + \quad (7)$$
$$h_1 \cdot F^Y_{i(64\times64)}(2, 0) - h_0 \cdot F^Y_{i(64\times64)}(3, 0)) +$$
$$h_1 \cdot (h_3 \cdot F^Y_{i(64\times64)}(0, 1) - h_2 \cdot F^Y_{i(64\times64)}(1, 1) +$$
$$h_1 \cdot F^Y_{i(64\times64)}(2, 1) - h_0 \cdot F^Y_{i(64\times64)}(3, 1)) +$$
$$h_2 \cdot (h_3 \cdot F^Y_{i(64\times64)}(0, 2) - h_2 \cdot F^Y_{i(64\times64)}(1, 2) +$$
$$h_1 \cdot F^Y_{i(64\times64)}(2, 2) - h_0 \cdot F^Y_{i(64\times64)}(3, 2)) +$$
$$h_3 \cdot (h_3 \cdot F^Y_{i(64\times64)}(0, 3) - h_2 \cdot F^Y_{i(64\times64)}(1, 3) +$$
$$h_1 \cdot F^Y_{i(64\times64)}(2, 3) - h_0 \cdot F^Y_{i(64\times64)}(3, 3))$$

$$a_3 = h_3 \cdot (h_0 \cdot F^Y_{i(64\times64)}(0, 0) + h_1 \cdot F^Y_{i(64\times64)}(1, 0) + \quad (8)$$
$$h_2 \cdot F^Y_{i(64\times64)}(2, 0) + h_3 \cdot F^Y_{i(64\times64)}(3, 0)) -$$
$$h_2 \cdot (h_0 \cdot F^Y_{i(64\times64)}(0, 1) + h_1 \cdot F^Y_{i(64\times64)}(1, 1) +$$
$$h_2 \cdot F^Y_{i(64\times64)}(2, 1) + h_3 \cdot F^Y_{i(64\times64)}(3, 1)) +$$
$$h_1 \cdot (h_0 \cdot F^Y_{i(64\times64)}(0, 2) + h_1 \cdot F^Y_{i(64\times64)}(1, 2) +$$
$$h_2 \cdot F^Y_{i(64\times64)}(2, 2) + h_3 \cdot F^Y_{i(64\times64)}(3, 2)) -$$
$$h_0 \cdot (h_0 \cdot F^Y_{i(64\times64)}(0, 3) + h_1 \cdot F^Y_{i(64\times64)}(1, 3) +$$
$$h_2 \cdot F^Y_{i(64\times64)}(2, 3) + h_3 \cdot F^Y_{i(64\times64)}(3, 3))$$

$$a_4 = h_3 \cdot (h_3 \cdot F^Y_{i(64\times64)}(0, 0) - h_2 \cdot F^Y_{i(64\times64)}(1, 0) + \quad (9)$$
$$h_1 \cdot F^Y_{i(64\times64)}(2, 0) - h_0 \cdot F^Y_{i(64\times64)}(3, 0)) -$$
$$h_2 \cdot (h_3 \cdot F^Y_{i(64\times64)}(0, 1) - h_2 \cdot F^Y_{i(64\times64)}(1, 1) +$$
$$h_1 \cdot F^Y_{i(64\times64)}(2, 1) - h_0 \cdot F^Y_{i(64\times64)}(3, 1)) +$$
$$h_1 \cdot (h_3 \cdot F^Y_{i(64\times64)}(0, 2) - h_2 \cdot F^Y_{i(64\times64)}(1, 2) +$$
$$h_1 \cdot F^Y_{i(64\times64)}(2, 2) - h_0 \cdot F^Y_{i(64\times64)}(3, 2)) -$$
$$h_0 \cdot (h_3 \cdot F^Y_{i(64\times64)}(0, 3) - h_2 \cdot F^Y_{i(64\times64)}(1, 3) +$$
$$h_1 \cdot F^Y_{i(64\times64)}(2, 3) - h_0 \cdot F^Y_{i(64\times64)}(3, 3))$$

where $$h_0 = \frac{1+\sqrt{3}}{4\sqrt{2}} \quad (10)$$

$$h_1 = \frac{3+\sqrt{3}}{4\sqrt{2}} \quad (11)$$

$$h_2 = \frac{3-\sqrt{3}}{4\sqrt{2}} \quad (12)$$

$$h_3 = \frac{1-\sqrt{3}}{4\sqrt{2}} \quad (13)$$

In the equations above, $a_1$ is the scaling function coefficient and captures colour content information and $a_2$, $a_3$ and $a_4$ are the wavelet transform coefficients and capture colour interrelation information. Those skilled in art will understand that the equations (6)-(13) may be modified to reduce the number of required calculations. These values may be written into the descriptor $V^Y_{i(64\times64)}$ along the lines of equation (5) and then, as shown in FIG. 3B, the 4×4 window slides two pixels to the right to form a new neighbourhood, descriptor elements are again calculated for the new pixel values, and so on. As shown in FIG. 3C, once the sliding window reaches the right edge of the image, there are not enough pixels to form a complete 4×4 neighbourhood. This problem can be handled in a number of ways. One of those ways it to assume that the data is mirrored, as shown in FIG. 3C. One other approach is to assume that the data is periodic. Other approaches also exist. The same problem also arises when the sliding window reaches the bottom edge of the image, and can be handled as stated above. As shown in FIG. 3D, once all the calculations for a set of rows is complete, the sliding window moves two pixels down and again starts sliding from left to right, until the entire image has been processed.

In the above descriptions, wavelet transforms are employed for the calculation of the descriptors. Alternative embodiments may rely on other processes for the calculation of colour content and colour interrelation descriptor elements. For example, an alternative embodiment may rely on a descriptor extraction process that produces colour content and interrelation descriptor elements but, unlike the aforementioned processes, the number of descriptor elements calculated per pixel neighbourhood is less than the number of pixels in the neighbourhood, resulting in smaller descriptors which are more convenient to store and process but still give a spatially uniform coverage of an image. Yet another alternative embodiment may rely on a descriptor extraction process whereby descriptor elements for a neighbourhood are calculated based on only a subset of the neighbourhood pixels, unlike the aforementioned processes, resulting in significant speed improvement.

For example, for the pixels $F^Y_{i(64 \times 64)}(0,0)$, $F^Y_{i(64 \times 64)}(1,0)$, $F^Y_{i(64 \times 64)}(0,1)$ and $F^Y_{i(64 \times 64)}(1,1)$ of a local neighbourhood as shown in FIG. 2A, an alternative embodiment of the invention calculates the descriptor elements $x_1$ to $x_4$ as $$x_1 = (F^Y_{i(64 \times 64)}(0,0) + F^Y_{i(64 \times 64)}(1,0) + F^Y_{i(64 \times 64)}(0,1) + F^Y_{i(64 \times 64)}(1,1))/4 \tag{14}$$

$$x_2 = (F^Y_{i(64 \times 64)}(0,0) - F^Y_{i(64 \times 64)}(1,0))/2 \tag{15}$$

$$x_3 = (F^Y_{i(64 \times 64)}(0,0) - F^Y_{i(64 \times 64)}(0,1))/2 \tag{16}$$

$$x_4 = (F^Y_{i(64 \times 64)}(0,0) - F^Y_{i(64 \times 64)}(1,1))/2 \tag{17}$$

Thus, the element $x_1$, which represents a local pixel average, captures colour content information, while the elements $x_2$, $x_3$ and $x_4$, each representing the difference between a pixel and another pixel, capture colour interrelation information. These values may be written into the descriptor $V^Y_{i(64 \times 64)}$ along the lines of equation (5) and then, as shown in FIG. 2B, the 2×2 window slides two pixels to the right to form a new neighbourhood, descriptor elements are again calculated for the new pixel values, and so on.

Yet another alternative embodiment of the invention replaces equations (14)-(17) with equations (I)-(IV) shown below $$\Phi_1 = (F^Y_{i(64 \times 64)}(0,0) + F^Y_{i(64 \times 64)}(1,0) + F^Y_{i(64 \times 64)}(0,1) + F^Y_{i(64 \times 64)}(1,1))/4 \tag{I}$$

$$\Phi_2 = (F^Y_{i(64 \times 64)}(0,0) - F^Y_{i(64 \times 64)}(1,0))/2 \tag{II}$$

$$\Phi_3 = (F^Y_{i(64 \times 64)}(1,0) - F^Y_{i(64 \times 64)}(1,1))/2 \tag{III}$$

$$\Phi_4 = (F^Y_{i(64 \times 64)}(1,1) - F^Y_{i(64 \times 64)}(0,1))/2 \tag{IV}$$

In the equations shown above, $\Phi_1$ captures colour content information while $\Phi_2$-$\Phi_4$ capture colour interrelation information.

Yet another alternative embodiment of the invention replaces equations (14)-(17) with equations (18) and (19) shown below $$\psi_1 = (F^Y_{i(64 \times 64)}(0,0) + F^Y_{i(64 \times 64)}(1,0) + F^Y_{i(64 \times 64)}(0,1) + F^Y_{i(64 \times 64)}(1,1))/4 \tag{18}$$

$$\psi_2 = \max(F^Y_{i(64 \times 64)}(0,0), F^Y_{i(64 \times 64)}(1,0), F^Y_{i(64 \times 64)}(0,1), F^Y_{i(64 \times 64)}(1,1)) - \min(F^Y_{i(64 \times 64)}(0,0), F^Y_{i(64 \times 64)}(1,0), F^Y_{i(64 \times 64)}(0,1), F^Y_{i(64 \times 64)}(1,1)) \tag{19}$$

In the equations shown above, $\psi_1$ captures colour content information while $\psi_2$ captures colour interrelation information.

Furthermore, although the previous descriptions and figures consider sliding neighbourhood windows of size 2×2 and 4×4 pixels, this is not restrictive. Alternative embodiments can specify any size and/or a geometry and/or a sliding step for the neighbourhood window, for example to suit given computational needs or the neighbourhood measurement process itself.

In the previous descriptions, the same neighbourhood window and descriptor extraction process are used at all locations of $F^Y_{i(64 \times 64)}$. In alternative implementations this need not be so. Alternative embodiments may employ different neighbourhood parameters and/or descriptor extraction processes at different locations in the image. For example, an alternative embodiment of the invention uses a fast descriptor extraction process at the perimeter of the image, such as the one of equations (1)-(4) or that of equations (14)-(17), and a slower but more powerful descriptor extraction process at the centre of the image, such as the one of equations (6)-(9).

Next, $F^Y_{i(64 \times 64)}$ is resampled to a new lower scale. In one embodiment, this new scale is 32×32 pixels. Then, the new descriptor $V^Y_{i(32 \times 32)}$ is calculated in exactly the same manner as for the 64×64 image. Note that it may be the case that no computations are actually required for this resampling. As can be seen in equation (1), the new pixel values were calculated earlier as LL values and are stored in $V^Y_{i(64 \times 64)}(1)$, $V^Y_{i(64 \times 64)}(5)$, $V^Y_{i(64 \times 64)}(9)$, ..., $V^Y_{i(64 \times 64)}(4093)$. Thus, in one embodiment, the descriptors $V^Y_{i(64 \times 64)}$, $V^Y_{i(32 \times 32)}$, $V^Y_{i(16 \times 16)}$, $V^Y_{i(8 \times 8)}$, $V^Y_{i(4 \times 4)}$, and $V^Y_{i(2 \times 2)}$ are calculated.

The embodiment of the invention outlined here comprises extracting descriptors at one or more scales of the image $F_i$. Thus, In the previous descriptions, the finest or maximum or highest scale, the coarsest or minimum or lowest scale, the number of scales and the relation between scales, are representative of only one possible embodiment of the invention and alternative embodiments may employ different such parameters in order, for example, to match the computational capabilities of a system.

In one embodiment of the invention, certain elements are removed from these scale-specific descriptors before subsequent processing. In one embodiment of the invention, for the descriptor extraction process outlined in equations (1)-(4), i.e. the Haar transform, at scales $2^b \times 2^b$, $2^{b-1} \times 2^{b-1}$, $2^{b-2} \times 2^{b-2}$ and so on, e.g. 64×64, 32×32, 16×16, and so on, all the LL elements in $V^Y_i$ may be removed except for the LL elements at the lowest scale. This is because the LL elements at a scale $2^{b-k} \times 2^{b-k}$ can be directly calculated from the LL values at scale $2^{b-k-1} \times 2^{b-k-1}$ and the HL, LH, and HH elements at scale $2^{b-k} \times 2^{b-k}$. Note that this property will not always hold. For example, it will not apply if the descriptors are calculated at scales $2^b \times 2^b$, $2^{b-2} \times 2^{b-2}$, $2^{b-4} \times 2^{b-4}$ and so on, e.g. 64×64, 16×16, 4×4, and so on. Also, it will not hold if only a subset of the LL, HL, LH and HH elements are calculated as part of the descriptor extraction process.

An equivalent property applies to the Daubechies' wavelet transform. That is, in one embodiment of the invention for the Daubechies' wavelet transform at scales $2^b \times 2^b$, $2^{b-1} \times 2^{b-1}$, $2^{b-2} \times 2^{b-2}$ and so on, e.g. 64×64, 32×32, 16×16, and so on, all the $a_1$ elements in $V^Y_i$ may be removed except for the $a_1$ elements at the lowest scale.

An equivalent property applies to the transform of equations (14)-(17). That is, in one embodiment of the invention for that transform at scales $2^b \times 2^b$, $2^{b-1} \times 2^{b-1}$, $2^{b-2} \times 2^{b-2}$ and so on, e.g. 64×64, 32×32, 16×16, and so on, all the $\square_1$ elements in $V^Y_i$ may be removed except for the $\square_1$ elements at the lowest scale. The same property also applies to the transform of equations (I)-(IV).

Applying the same descriptor extraction process to the $C_b$ and $C_r$ channels of $F_i$ gives the descriptors $V^{Cb}_{i(64 \times 64)}, \ldots, V^{Cb}_{i(2 \times 2)}$ and $V^{Cr}_{i(64 \times 64)}, \ldots, V^{Cr}_{i(64 \times 64)}$. All these scale-specific channel-specific descriptors capture the image's spatially sensitive colour content and interrelation information at multiple scales and across multiple channels.

In the previous descriptions, $F_i$ is assumed to be in the $YC_bC_r$ colour space and all the channels are used in the extraction of the descriptors. Alternative implementations may represent the image in a new colour space before the calculation of the descriptors and/or use only a subset of the colour planes in the calculation of its descriptors.

In the previous descriptions, the descriptors across the different colour channels of $F_i$ are calculated at the same scales. In alternative implementations this need not be so. For example, an alternative embodiment of the invention calculates the Y channel descriptors at more scales and/or different scales than the $C_b$ and/or $C_r$ channel descriptors. Such fine tuning results in a better adaptation to a specific image or video material and can improve the performance.

In the previous descriptions, the same neighbourhood window and descriptor extraction process is used for all the colour channels of $F_i$. In alternative implementations this need not be so. Alternative embodiments may employ different neighbourhood parameters and/or descriptor extraction processes for each channel. For example, an alternative embodiment of the invention uses a fast descriptor extraction process for the $C_b$ and $C_r$ channels and a slower but more powerful descriptor extraction process for the Y channel. Such fine tuning results in a better adaptation to a specific image or video material and can improve the performance of a system.

In one embodiment of the invention, some or all of the descriptor elements are represented as real numbers with an integer and a fractional part. In another embodiment of the invention some or all of the descriptor elements are represented in integer form, for example by truncating or by rounding their fractional part. In yet another embodiment of the invention some or all of the descriptor elements are represented in integer form by scaling. For example, equations (1)-(4) produce real numbers where the fractional part can take only three values, namely 0.25, 0.50 and 0.75. Thus, multiplying the descriptor elements with the value 4 will result in integer representations without any information loss. In yet another embodiment of the invention some or all of the descriptor elements are represented in integer form by any means and are then quantised to shorter values, for example 3 or 4 bits long.

Thus, in one embodiment of the invention, image $F_i$ is represented by its descriptors $V^{C1}_{i(C1SCq)}, \ldots, V^{C1}_{i(C1SCq)}, V^{C2}_{i(C2SCq)}, \ldots, V^{C2}_{i(C2SC1)}, \ldots, V^{Cp}_{i(CpSCq)}, \ldots, V^{Cp}_{i(CpSC1)}$ where C1, C2, ..., Cp are a first, second and $p^{th}$ colour channel of $F_i$, C1SCq is the highest descriptor scale for channel C1, C1SC1 is the lowest descriptor scale for channel C1, C2SCq is the highest descriptor scale for channel C2, C2SC1 is the lowest descriptor scale for channel C2, and so on. All these scale-specific channel-specific descriptors capture the image's spatially sensitive colour content and interrelation information at multiple scales (preferably more than one) and across multiple channels (preferably more than one).

Fusing, i.e. concatenating, all these descriptors of image $F_i$ into a single descriptor V; for comparison with the descriptor $V_j$ or image $F_j$, as is the common approach in the prior art, can result in non-optimal performance, both in terms of the speed of comparison and in terms of understanding the relationship between $F_i$ and $F_j$.

One embodiment of the invention is characterised by the fusion of the scale-specific channel-specific descriptors into at least two descriptors capturing different scales. For example, for scale-specific channel-specific descriptors at six different scales, one embodiment of the invention generates scale-specific multi-channel descriptors at the same six scales. Another embodiment generates two scale-oriented multi-channel descriptors, one for the low scales and one for the high scales, while yet another embodiment generates three scale-oriented multi-channel descriptors, one for the low scales, one for the medium scales and one for the high scales. In a preferred embodiment of the invention, descriptors are indeed calculated across multiple channels and fused into scale-oriented descriptors, but an alternative embodiment calculates descriptors on only a single channel and fuses them into scale-oriented descriptors.

Figure 4:
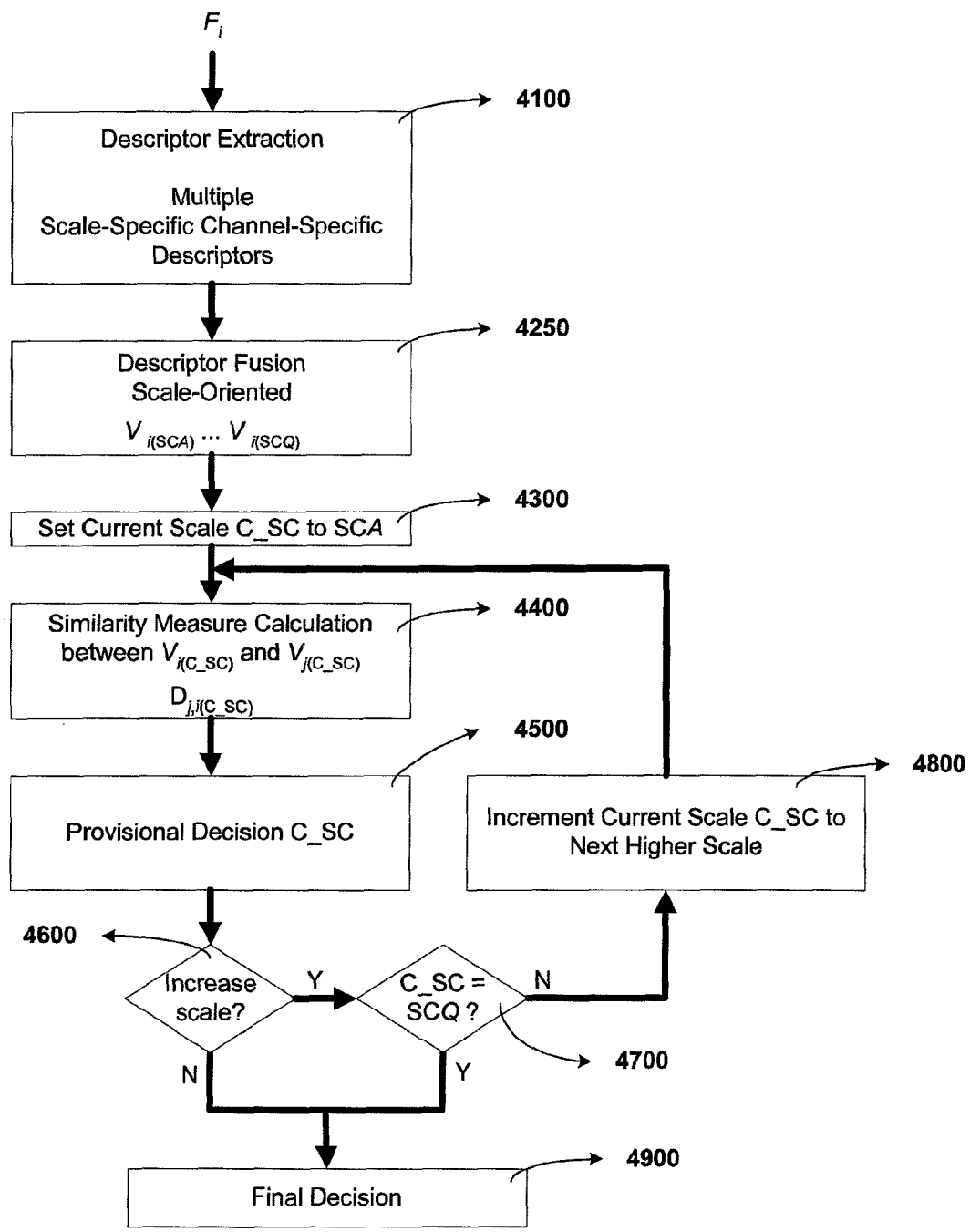
FIG. 4 is a flow diagram for comparing a plurality of images according to an embodiment of the invention.

One embodiment of the invention along the lines of the previous paragraph is illustrated in FIG. 4. In step 4100, scale-specific channel-specific descriptors are extracted as previously explained. In step 4250, these descriptors are fused into the set of scale-oriented multi-channel descriptors $V_{i(SCQ)}, \ldots, V_{i(SCA)}$, where SCA and SCQ are the lowest and highest descriptor scales respectively. In step 4300, the current scale C_SC is set to the lowest scale SCA. In step 4400, only the current scale C_SC descriptors $V^Y_{i(C\_sc)}$ and $V^Y_{i(C\_sc)}$ are used for the calculation of a similarity measure $D_{j,i(C\_sc)}$ between images $F_i$ and $F_j$. In step 4500, the similarity measure is used in the making of a provisional decision on the similarity or dissimilarity of the two images. In step 4600, the similarity measure and/or the provisional decision are examined to determine whether processing at a higher scale is desirable. If it is decided that such processing is not desirable, the process moves to step 4900 where a final decision on the similarity or dissimilarity of the two images is made. Otherwise, the process moves to step 4700 where it is checked whether there any descriptors of higher scales left to process. If there are higher scale descriptors available then the process continues to step 4800, where the current scale C_SC is increased, and then onto step 4400, where a new similarity measure is calculated at the new scale, and so on. If, on the other hand, there are no higher scale descriptors available then the process continues to step 4900 where a final decision on the similarity or dissimilarity of the two images is made.

The aim of such a scale-oriented serial configuration as illustrated in FIG. 4 is to ascertain the similarity or dissimilarity between two images as quickly, and with as few computations, as it is possible. Thus, such a scheme can enhance the speed of a system compared to a scheme where all the available descriptors are fused into a single descriptor.

The various steps of this process will now be examined more closely.

In step 4400, there are many options for the calculation of a similarity measure. For example, in one embodiment of the invention the L1 distance between two descriptors $V_i$ and $V_j$, of n elements each, may be calculated as the similarity measure, given by $$L1_{j,i} = \sum_{l=0}^{n} |V_j(l) - V_i(l)| \tag{20}$$

Embodiments of the invention outlined here relate to using said descriptors for the calculation of one or more similarity measures, comprising at least two values, between images. Thus, The L1 distance of equation (20) for the calculation of descriptor distances relates to only one possible implementation of the invention. An alternative implementation replaces equation (20) with equation (21) below, which calculates the L2 distance $$L2_{j,i} = \sqrt{\sum_{l=0}^{n} (|V_j(l) - V_i(l)|)^2} \tag{21}$$

There is great variety of such distance metrics available in the relevant literature.

Furthermore, an alternative implementation replaces equation (20) with equation (22) below, which calculates the weighted L1 distance $$L1_{j,i} = \sum_{l=0}^{n} (w(l) \cdot |V_j(l) - V_i(l)|) \tag{22}$$

where $w(l)$ is the weighting factor for the $l^{th}$ descriptor elements. Furthermore, the application of weights may also be used in conjunction with the L2 distance of equation (21) or any other suitable distance metric available in the literature.

There are many options for the processing of the similarity measure. In one embodiment of the invention, in step 4500 a thresholding function is applied to the similarity measure $D_{j,i}$. That is, for a threshold value thr, if $$D_{j,i} \geq thr \tag{23}$$

the two images are deemed too dissimilar and the provisional decision "dissimilar" is made in step 4500. Based on this, step 4600 decides that no further processing is needed and this provisional decision is finalised in step 4900. On the other hand, if the relation of (23) is not satisfied in step 4500, a provisional decision "similar" is made in that step. Based on this, step 4600 decides that further processing would be desirable. If there are available descriptors at a higher scale, the process then loops back to step 4400. Otherwise, the provisional decision "similar" is finalised in step 4900.

Embodiments of the invention outlined here extend to using said similarity measures, comprising at least two values, to ascertain the similarity or dissimilarity between images. Thus, In an alternative embodiment of the invention if $$D_{j,i} \leq thr \tag{24}$$

the two images are deemed similar and the provisional decision "similar" is made in step 4500. Based on this, step 4600 decides that no further processing is needed and this provisional decision is finalised in step 4900. On the other hand, if the relation of (24) is not satisfied in step 4500, a provisional decision "dissimilar" is made in that step. Based on this, step 4600 decides that further processing would be desirable. If there are available descriptors at a higher scale, the process then loops back to step 4400. Otherwise, the provisional decision "dissimilar" is finalised in step 4900.

Yet another embodiment of the proposed invention uses two threshold values thr1 and thr2 with thr1<thr2. Then, if $$D_{j,i} \leq thr1 \tag{25}$$

the two images are deemed similar and the provisional decision "similar" is made in step 4500. Based on this, step 4600 decides that no further processing is needed and this provisional decision is finalised in step 4900. On the other hand, if the relation of (25) is not satisfied in step 4500, a provisional decision "dissimilar" is made in that step. Then, in step 4600, if $$D_{j,i} \geq thr2 \tag{26}$$

step 4600 decides that no further processing is needed and this provisional decision is finalised in step 4900. Otherwise, step 4600 decides that further processing would be desirable. If there are available descriptors at a higher scale, the process then loops back to step 4400. Otherwise, the provisional decision "dissimilar" is finalised in step 4900 or, alternatively, a new decision "maybe" is produced in step 4900, which indicates that after all the descriptor scales have been exhausted no confident decision could be reached.

The semantics of the decision that is made in step 4900 depends on the specific implementation.

In one embodiment of the invention, $F_i$ and $F_j$ are temporally ordered images. For example, they are frames of a video $F_z$, and the aim is to find whether a frame discontinuity exists between $F_j$ and $F_i$, such as a shot transition or lighting effect and the such. Then, the decision at step 4900 will be whether the similarity measure between $F_j$ and $F_i$ indicates such a frame discontinuity. Such a system would be used for the purpose of segmenting a video.

In another embodiment of the invention $F_j$ and $F_i$ are individual images with no temporal ordering. For example, $F_j$ is an image of a set of images $F_z$ and $F_i$ is another image, either from inside or outside $F_z$, and the aim is to find those images in $F_z$ that are similar to $F_i$. Then, the decision of step 4900 will be whether the similarity measure between $F_j$ and $F_i$ indicates that the images are similar. Such a system would be used for image retrieval by query or for the categorisation of images in a database.

In one embodiment of the invention, one or both of the descriptors $V_j$ and $V_i$ of step 4400 represent not images but groups of images.

For example, in one embodiment of the invention $V_j$ is a function, such as the average or the median, of the descriptors $V_{j1}, V_{j2}, \ldots V_{jg}$ of images $F_{j1}, F_{j2}, \ldots, F_{jg}$ which form the cluster of images $F_j$. For example, $F_j$ could be a cluster of images representing cars. For an image $F_i$, ascertaining the similarity between descriptors $V_i$ and $V_j$ will then reveal not whether $F_i$ is similar to a particular image, but whether it is similar to a particular class or cluster of images. A set of images $F_z$ could contain any number of such clusters, and such a processing would reveal which particular cluster a given image matches best. Furthermore, a cluster may be represented not only by $V_j$ but also by other statistics such as the covariance matrix of the descriptors of its images, which allows the calculation of more complex similarity measures in step 4400, such as the Mahalanobis distance or the maximum likelihood measure.

In another embodiment of the invention for the segmentation of video, $V_j$ is a function, such as the average or the median, of the descriptors $V_{j1}, V_{j2}, \ldots, V_{jg}$ of frames $F_{j1}$, $F_{j2}, \ldots, F_{jg}$. These frames might all precede the frame $F_i$, or they might all follow it, or some may precede it and some may follow it.

Embodiments of the invention outlined here extend to using said similarity measures, comprising at least two values, to ascertain the similarity or dissimilarity between images. Thus, In the previous embodiments of the invention for video segmentation, in step 4500, the similarity measure between two frames $F_i$ and $F_j$ is used for the detection of frame discontinuities. An alternative embodiment of the invention uses not only this similarity measure but also the similarity measures between frames around frames $F_i$ and $F_j$.

For example, in one embodiment of the invention $j=i-1$ and the detection of frame discontinuities relies on the similarity measures $D_{i+k-1,i+k}$. $k \square [-t_1, t_2]$. In a preferred embodiment, $t1=t2=t$. Thus, the frames $F_{i+k}$ form a temporal window centred on frame $F_i$. Then, a frame discontinuity is detected between $F_{i-1}$ and $F_i$ if and only if $$D_{i-1,i} \geq D_{i+k-1,i+k} \; \forall \; k \in [-t, t], k \neq 0 \text{ and} \tag{27}$$

$$\frac{D_{i-1,i}}{D_{i+p-1,i+p}} \geq thr \tag{28}$$

with $D_{i+p-1,i+p} \geq D_{i+k-1,i+k} \; \forall \; k, p \in [-t, t], k, p \neq 0$ According to equations (27) and (28), each similarity measure $D_{i-1,i}$ is considered inside a temporal window of size $2t+1$, centred on $D_{1-1,i}$. Then, a discontinuity is detected between frames $F_{i-1}$ and $F_i$ if and only if $D_{i-1,i}$ is the largest distance within the temporal window and at least thr times larger than the second largest distance inside the temporal window. Such a temporally adaptive scheme aims in reducing the number of false detections resulting from high motion levels between frames. There are several such schemes of processing such a time series for the detection of frame discontinuities.

In a preferred embodiment of the invention, any thresholds and control parameters used in the processing of the scale-oriented descriptors are also scale-oriented.

In an alternative embodiment the serial processing of the scale-oriented descriptors terminates before the highest scale descriptor has been processed, according to instructions by a user or by the automatic system employing the process. This could be done to further increase the speed of a system, for example in real-time on-line applications and when the system cannot keep pace with the data rate.

Figure 5:
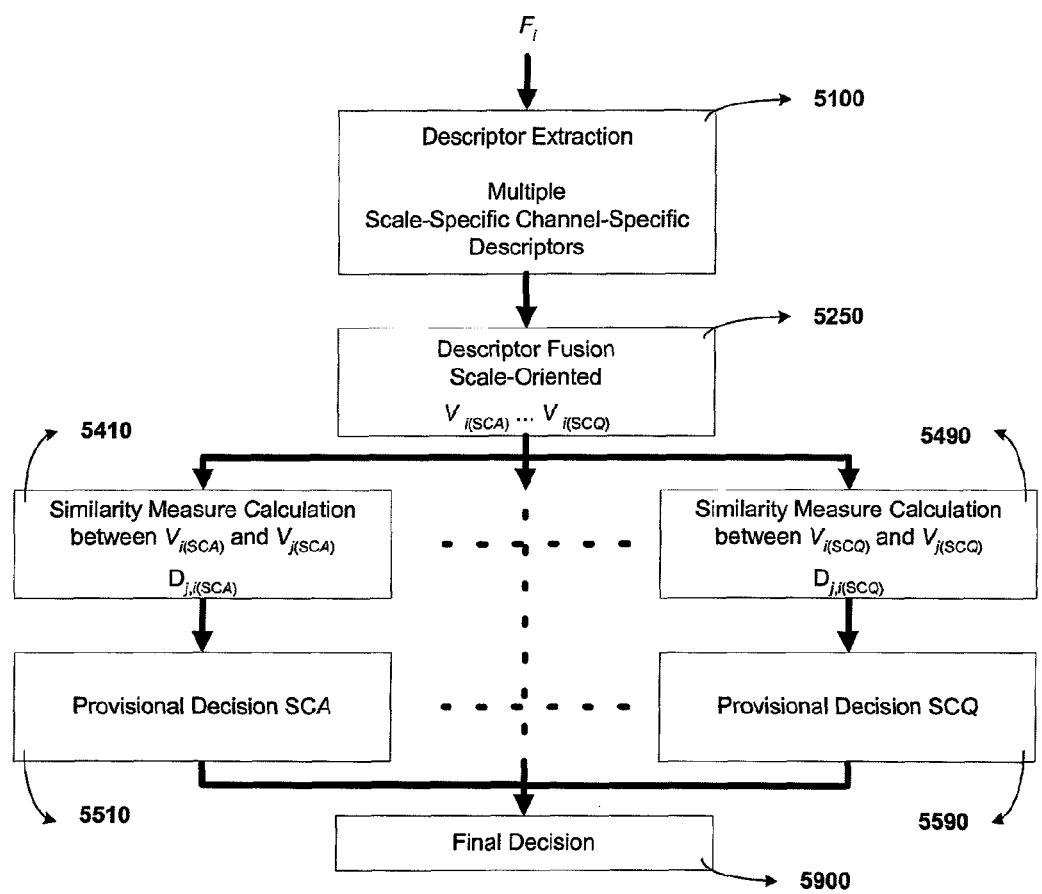
FIG. 5 is a flow diagram for comparing a plurality of images according to a further embodiment of the invention.

Another embodiment of the invention is illustrated in FIG. 5. In step 5100, scale-specific channel-specific descriptors are extracted as previously explained. In step 5250, these descriptors are fused into the set of scale-oriented multi-channel descriptors $V_{i(SCQ)}, \ldots V_{i(SCA)}$, where SCA and SCQ are the lowest and highest descriptor scales respectively. In steps 5410, ..., 5490 the scale-oriented descriptor pairs $V_{i(SCA)}$ and $V_{j(SCA)}, \ldots V_{i(SCQ)}$ and $V_{j(SCQ)}$ are used for the calculation of the similarity measures $D_{j,i(SCA)}, \ldots D_{j,i(SCQ)}$ between images $F_i$ and $F_j$. Thus, multiple similarity measures are calculated, one for each scale of the descriptors. In steps 5510, ... 5590, each similarity measure is used in the making of a provisional decision on the similarity or dissimilarity of the two images. Thus, multiple provisional decisions are made, one for each scale of the descriptors. Then, in step 5900, the multiple provisional decisions are used in the making of a final decision on the similarity or dissimilarity of the two images.

The aim of such a scale-oriented parallel configuration as illustrated in FIG. 5 is to allow a more thorough exploration of the relationship between images $F_i$ and $F_j$ by processing similarity decisions at different scales. Thus, such a system can provide not only final similarity decisions, but also additional information like "the images are similar at a very coarse level, but differ significantly in the fine details". In contrast, a system where scale-specific channel-specific descriptors are fused into a single multi-scale-multi-channel descriptor can only provide a similarity decision for two images.

Thus, in one embodiment of the invention for the retrieval of images from a set of images that are similar to a given image $F_i$, a scheme as illustrated in FIG. 5 allows the retrieval results to be presented in a hierarchical fashion. First, a set of images $F_A$ that are similar to $F_i$ at a coarse level (i.e. similar according to the low scale descriptors), then a set of images $F_B$, which is subset of $F_A$, that are similar to $F_i$ at a finer level of detail and so on.

In another embodiment of the invention for the detection of frame discontinuities and segmentation of a video, a scheme as illustrated in FIG. 5 allows a segmentation at different granularities, i.e. coarse, medium, fine, etc.

In FIG. 5, step 5100 is analogous to step 4100 of FIG. 4 and all methodologies, extensions and modifications described earlier for step 4100 apply here as well.

Similarly, step 5250 is analogous to step 4250 of FIG. 4 and all methodologies, extensions and modifications described earlier for step 4250 apply here as well.

Similarly, each of steps 5410, ..., 5490 is analogous to step 4400 of FIG. 4 and all methodologies, extensions and modifications described earlier for step 4400 apply here as well.

Similarly, each of steps 5510, ..., 5590 is analogous to step 4500 of FIG. 4 and all methodologies, extensions and modifications described earlier for step 4500 apply here as well.

In one embodiment of the invention, the provisional decisions of steps 5510, ..., 5590 are binary decisions, for example "1" denoting "similar" and "0" denoting "dissimilar".

In another embodiment of the invention, the provisional decisions of steps 5510, ..., 5590 are not binary but comprise at least three values. In such a case, the term "likelihood measure" is better than the term "provisional decision" to describe the results of processing steps 5510, ... 5590. For example, in one embodiment of the invention, each of steps 5510, ..., 5590 uses three thresholds. If a similarity measure is below a first threshold, a similarity likelihood measure of "0", denoting "dissimilar" is produced. If a similarity measure is above the first threshold but below a second threshold, which is higher than the first threshold, a similarity likelihood measure of "1", denoting "probably dissimilar" is produced. If a similarity measure is above the second threshold but below a third threshold, which is higher than the second threshold, a similarity likelihood measure of "2", denoting "probably similar" is produced. If a similarity measure is above the third threshold, a similarity likelihood measure of "3", denoting "similar" is produced. In another embodiment of the invention, the likelihood measures are produced not through thresholding but by normalisation of the similarity measures to the fixed range, e.g. between 0 and 1.

Denoting the binary provisional decisions or the likelihood measures as $Z_{j,i(SCA)}, \ldots, Z_{j,i(SCQ)}$, in one embodiment of the invention in step 5900, a final decision that $F_i$ and $F_j$ are similar is made if and only if $$W_{SCA} \cdot Z_{j,i(SCA)} + \ldots + W_{SCQ} \cdot Z_{j,i(SCQ)} \geq thr_f \tag{29}$$

where $thr_f$ is a threshold value and $W_{SCA}, \ldots, W_{SCQ}$ are weights controlling the significance given to each scale-oriented decision or likelihood measure. These weights can be eliminated if so desired by setting $W_{SCA}= \ldots =W_{SCQ}=1$ In another embodiment of the invention where likelihood measures comprising at least three values are produced by steps 5510, ..., 5590, two images are deemed similar if and only if the condition of equation (29) holds and, in addition, none or not more than a given number of individual likelihood measures are below a new second threshold.

In a preferred embodiment of the invention, any thresholds and control parameters used in the processing of the scale-oriented descriptors are also scale oriented.

In the parallel processing of a set of descriptors, such as the ones described in this embodiment, there are many such schemes one may employ in order to reach a definitive decision.

One embodiment of the invention is characterised by the fusion of the scale-specific channel-specific descriptors into at least two descriptors across different colour channels. For example, for scale-specific channel-specific descriptors across the Y, $C_b$ and $C_r$ channels, one embodiment of the invention generates three multi-scale channel-oriented descriptors, while another embodiment generates two multi-scale channel-oriented descriptors, one for the Y channel and one for the $C_b$ and $C_r$ channels. In a preferred embodiment of the invention, descriptors are indeed calculated at multiple scales and fused into channel-oriented descriptors, but an alternative embodiment calculates descriptors at only a single scale and fuses them into channel-oriented descriptors.

Figure 6:
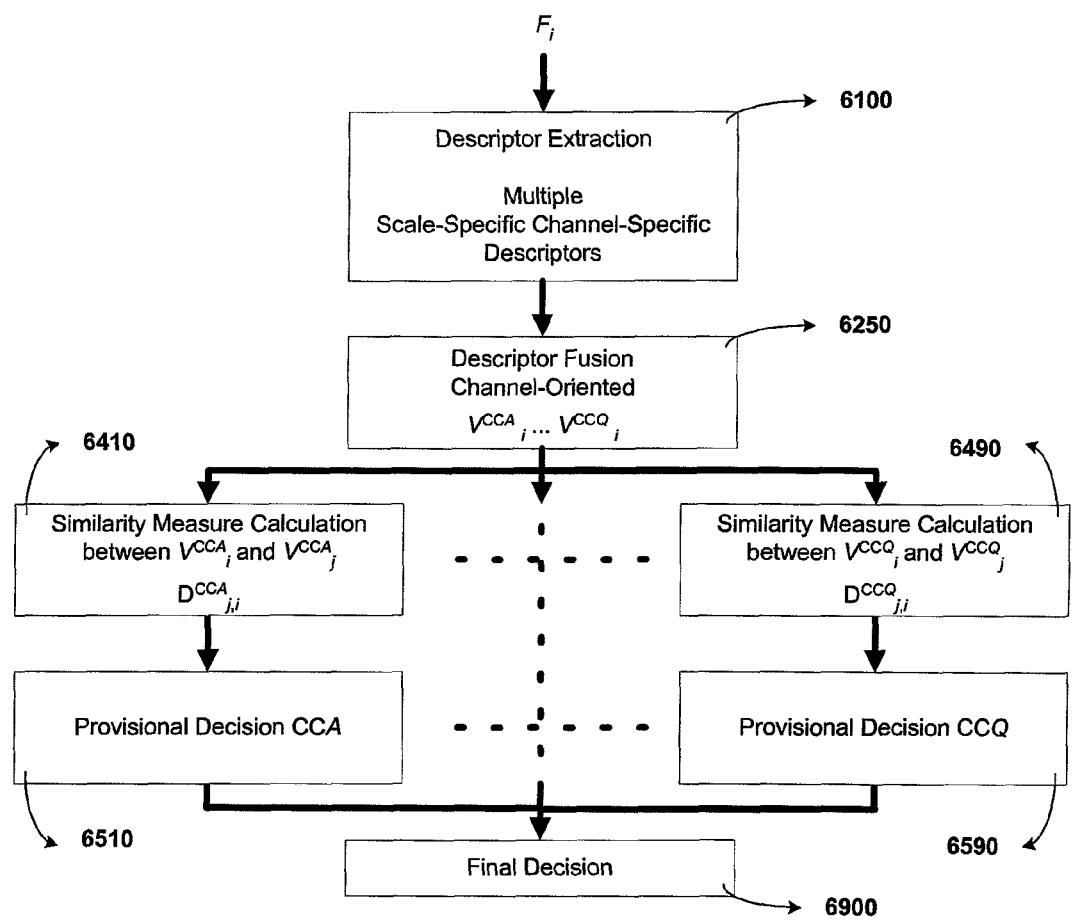
FIG. 6 is a flow diagram for comparing a plurality of images according to a further embodiment of the invention.

One embodiment of the invention along the lines of the previous paragraph is illustrated in FIG. 6. In step 6100, scale-specific channel-specific descriptors are extracted as previously explained. In step 6250, these descriptors are fused into the set of multi-scale channel-oriented descriptors $V^{CCA}_i, \ldots, V^{CCQ}_i$, where CCA, ..., CCQ are colour channels or groups of colour channels. For example, in one embodiment of the invention, CCA represents the Y channel and CCB the $C_bC_r$ pair of channels. In another embodiment of the invention, CCA represents the R channel or RGB, CCB the G channel, and CCC the B channel. In steps 6410, ..., 6490 the channel-oriented descriptor pairs $D^{CCA}_i$ and $V^{CCA}_j, \ldots, V^{CCQ}_i$ and $V^{CCQ}_j$ are used for the calculation of the similarity measures $D^{CCA}_{j,i}, \ldots D^{CCQ}_{j,i}$ between images $F_i$ and $F_j$. Thus, multiple similarity measures are calculated, one for each channel-oriented descriptor. In steps 6510, ... 6590, each similarity measure is used in the making of a provisional decision on the similarity or dissimilarity of the two images. Thus, multiple provisional decisions are made, one for each channel-oriented descriptor. Then, in step 6900, the multiple provisional decisions are used in the making of a final decision on the similarity or dissimilarity of the two images.

The aim of such a channel-oriented parallel configuration as illustrated in FIG. 6 is to allow a more thorough exploration of the relationship between images $F_i$ and $F_j$ by processing similarity decisions across different colour channels, capturing different information about the images. Thus, such a system can provide not only final similarity decisions, but also additional information like "the images are similar in the chrominance channels, but dissimilar in the luminance channel". In contrast, a system where scale-specific channel-specific descriptors are fused into a single multi-scale-multi-channel descriptor can only provide a similarity decision for two images.

Thus, in one embodiment of the invention for the detection of frame discontinuities, such as shot transitions or lighting effects and the such, a system as illustrated in FIG. 6 not only reliably detects frame discontinuities, but also separates the shot transitions from the other lighting effects. For example, if it is found that two frames differ substantially both in terms of chrominance and luminance, this indicates a shot transition. On the other hand, if it is found that two frames differ substantially in terms of luminance but very little in terms of chrominance, this indicates a global lighting effect, but not a shot transition.

In an alternative embodiment of the invention for the retrieval of images from a set of images that are similar to a given image $F_i$, a scheme as illustrated in FIG. 6 allows retrieval of images that are semantically similar to the query image, for example images of the same landscape or cityscape but captured at different times of the day and under different lighting conditions.

In FIG. 6, step 6100 is analogous to step 5100 of FIG. 5 and all methodologies, extensions and modifications described earlier for step 5100 apply here as well.

Similarly, step 6250 is analogous to step 5250 of FIG. 5 and all methodologies, extensions and modifications described earlier for step 5200 apply here as well.

Similarly, steps 6410, ..., 6490 are analogous to steps 5410, ..., 5490 of FIG. 5 and all methodologies, extensions and modifications described earlier for steps 5410, ..., 5490 apply here as well.

Similarly, steps 6510, ..., 6590 are analogous to steps 5510, ..., 5590 of FIG. 5 and all methodologies, extensions and modifications described earlier for steps 5510, ..., 5590 apply here as well.

Similarly, step 6900 is analogous to step 5900 of FIG. 5 and all methodologies, extensions and modifications described earlier for step 5900 apply here as well.

Another embodiment of the invention is characterised by the initial splitting of the scale-specific channel-specific descriptors into scale-specific channel-specific feature-semantics-oriented descriptors and their subsequent fusion into at least two descriptors of different feature semantics. For example, in one embodiment of the invention, for scale-specific channel-specific descriptors at six different scales and across three different colour channels a total of 18 descriptors is initially available. These 18 descriptors are split into 36 descriptors, half of which contain only colour content elements, such as the LL of equation (1), while the other half contain only colour interrelation elements, such as the HL, LH and HH of (2)-(4). Then, these 36 descriptors are fused into two descriptors, one containing all the colour content elements at multiple scales and across different channels and the other containing all the colour interrelation elements at multiple scales and across different channels. In another embodiment of the invention, each initial descriptor is split into more than two descriptors. For example, each descriptor is split into four descriptors, one for each of the LL, HL, LH and HH types of elements. These descriptors are then fused into four final descriptors each containing only one type of element, e.g. only LL or only HH, at different scales and across different channels. In a preferred embodiment of the invention, descriptors are indeed calculated at multiple scales and across multiple channels, but alternative embodiments may calculate descriptors at only a single scale and/or for only a single channel.

Figure 7:
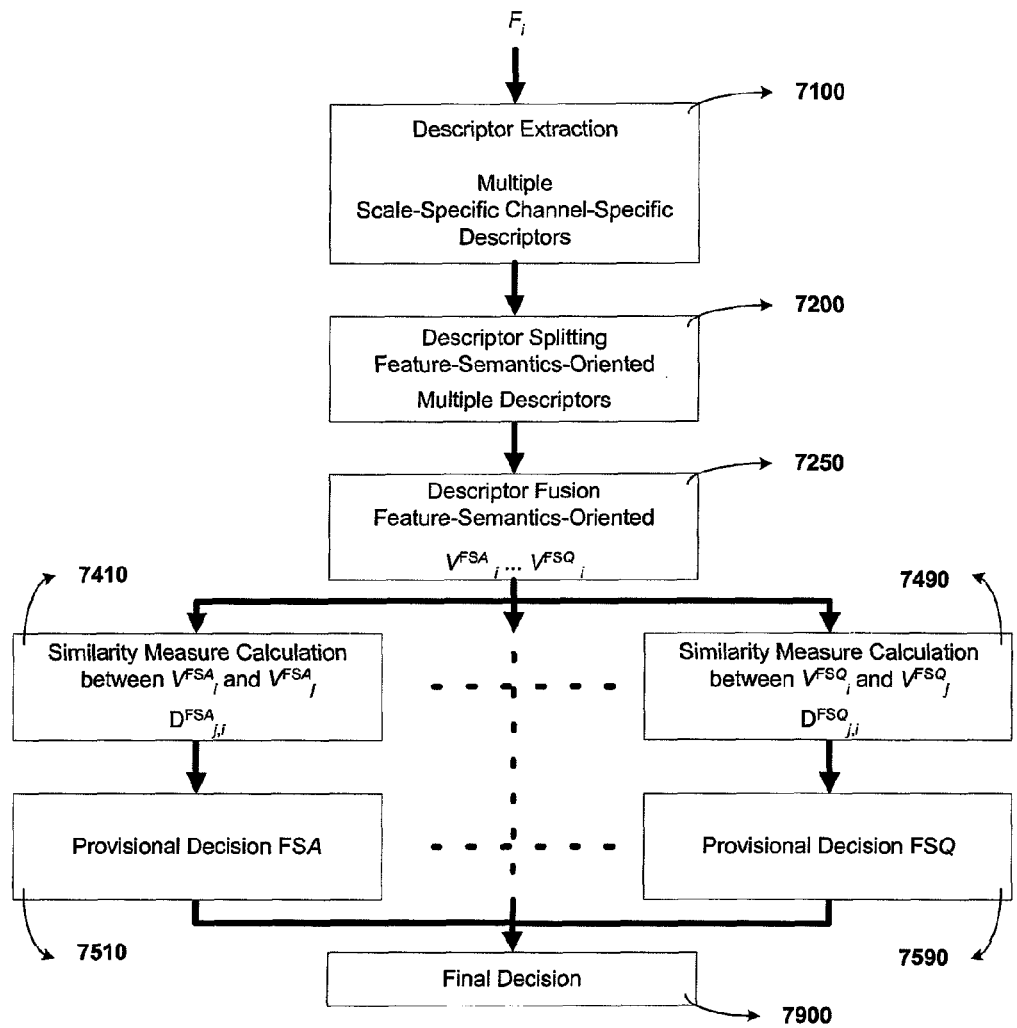
FIG. 7 is a flow diagram for comparing a plurality of images according to a further embodiment of the invention.

One embodiment of the invention along the lines of the previous paragraph is illustrated in FIG. 7. In step 7100, scale-specific channel-specific descriptors are extracted as previously explained. In step 7200, these descriptors are split according to feature semantics as explained above. In step 7250 the resultant descriptors are fused into the set of multi-scale multi-channel feature-semantics-oriented descriptors $V^{FSA}_i, \ldots, V^{FSQ}_i$, where FSA, ..., FSQ represent feature types. For example, in one embodiment of the invention, FSA represents the LL elements and FSB the HL, LH and HH elements. In another embodiment of the invention, FSA represents the LL elements, FSB the HL elements, FSC the LH elements and FSD the HH elements. In steps 7410, ..., 7490 the feature-semantics-oriented descriptor pairs $V^{FSA}_i$ and $V^{FSA}_{j,i}, \ldots, V^{FSQ}_i$ and $V^{FSQ}_j$ are used for the calculation of the similarity measures $D^{FSA}_{j,i}, \ldots, D^{FSQ}_{j,i}$ between images $F_i$ and $F_j$. Thus, multiple similarity measures are calculated, one for each feature-semantics-oriented descriptor. In steps 7510, ... 7590, each similarity measure is used in the making of a provisional decision on the similarity or dissimilarity of the two images. Thus, multiple provisional decisions are made, one for each feature-semantics-oriented descriptor. Then, in step 7900, the multiple provisional decisions are used in the making of a final decision on the similarity or dissimilarity of the two images.

The aim of such a feature-semantics-oriented parallel configuration as illustrated in FIG. 7 is to allow a more thorough exploration of the relationship between images $F_i$ and $F_j$ by processing similarity decisions based on different feature types, capturing different information about the images. Thus, such a system can provide not only final similarity decisions, but also additional information like "the images are similar in terms of local edges, but dissimilar in terms of colour content". In contrast, a system where scale-specific channel-specific descriptors are fused into a single multi-scale-multi-channel descriptor can only provide a similarity decision for two images.

Thus, in one embodiment of the invention for the detection of frame discontinuities, such as shot transitions or lighting effects and the such, a system as illustrated in FIG. 7 not only reliably detects frame discontinuities, but also separate the shot transitions from the other lighting effects. For example, if it is found that two frames differ substantially both in terms of colour content and colour interrelations, this indicates a shot transition. On the other hand, if it is found that two frames differ substantially in terms of colour content but very little in terms of colour interrelations, this indicates a global lighting effect, but not a shot transition.

In an alternative embodiment of the invention for the retrieval of images from a set of images that are similar to a given image $F_i$, a scheme as illustrated in FIG. 7 allows retrieval of images that are semantically similar to the query image, for example images of the same scene but captured under different lighting conditions or with different equipment resulting in different contrast levels.

In FIG. 7, step 7100 is analogous to step 6100 of FIG. 6 and all methodologies, extensions and modifications described earlier for step 6100 apply here as well.

In FIG. 7, step 7200 is analogous to step 6200 of FIG. 6 and all methodologies, extensions and modifications described earlier for step 6200 apply here as well.

Similarly, step 7250 is analogous to step 6250 of FIG. 6 and all methodologies, extensions and modifications described earlier for step 6250 apply here as well.

Similarly, steps 7410, ..., 7490 are analogous to steps 6410, ..., 6490 of FIG. 6 and all methodologies, extensions and modifications described earlier for steps 6410, ..., 6490 apply here as well.

Similarly, steps 7510, ..., 7590 are analogous to steps 6510, ..., 6590 of FIG. 6 and all methodologies, extensions and modifications described earlier for steps 6510, ..., 6590 apply here as well.

Similarly, step 7900 is analogous to step 6900 of FIG. 6 and all methodologies, extensions and modifications described earlier for step 6900 apply here as well.

Another embodiment of the invention is characterised by the initial splitting of the scale-specific channel-specific descriptors into scale-specific channel-specific region-oriented descriptors and their subsequent fusion into at least two descriptors covering different regions in the images. For example, in one embodiment of the invention, for scale-specific channel-specific descriptors at the five different scales 64×64, 32×32, ..., 4×4 and across three different colour channels a total of 15 descriptors is initially available. These 15 descriptors are split into four sets of 15 descriptors, each set containing only those elements that correspond to a particular quadrant of the image, i.e. one set for the upper-left quadrant, one set for the upper-right quadrant, one set for the lower-left quadrant, and one set for the lower-right quadrant. These descriptors are then fused into four descriptors, one containing all the descriptor elements at multiple scales and across different channels for the upper-left quadrant of the image, one for the upper-right quadrant of the image, etc. In another embodiment of the invention, multiple region-oriented descriptors are formed corresponding to vertical slices of the image. In yet another embodiment, multiple region-oriented descriptors are formed corresponding to horizontal slices of the image. In a preferred embodiment of the invention, descriptors are indeed calculated at multiple scales and across multiple channels, but alternative embodiments may calculate descriptors at only a single scale and/or for only a single channel.

Figure 8:
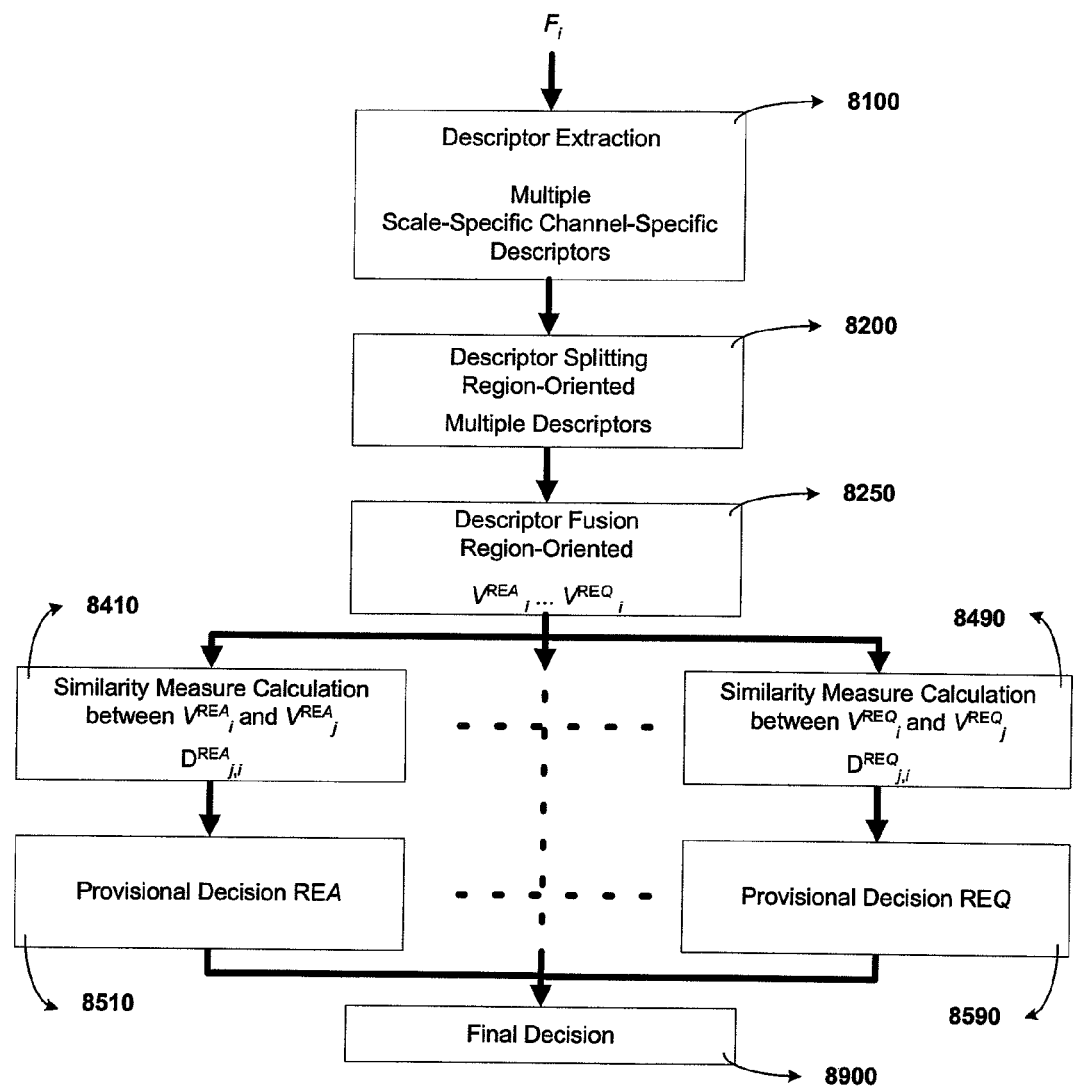
FIG. 8 is a flow diagram for comparing a plurality of images according to a further embodiment of the invention.

One embodiment of the invention along the lines of the previous paragraph is illustrated in FIG. 8. In step 8100, scale-specific channel-specific descriptors are extracted as previously explained. In step 8200, these descriptors are split according to image regions as explained above. In step 8250 the resultant descriptors are fused into the set of multi-scale multi-channel region-oriented descriptors $V^{REA}_i, \ldots, V^{REQ}_i$, where REA, ..., REQ represent image regions. For example, in one embodiment of the invention, REA represents the upper-left quadrant of the image, REB the upper-right quadrant of the image, REC the lower-left quadrant of the image and RED the lower-right quadrant of the image. In steps 8410, ..., 8490 the region-oriented descriptor pairs $V^{REA}_i$ and $V^{REA}_j, \ldots, V^{REQ}_i$ and $V^{REQ}_j$ are used for the calculation of the similarity measures $D^{REA}_{j,i}, \ldots, D^{REQ}_{j,i}$ between images $F_i$ and $F_j$. Thus, multiple similarity measures are calculated, one for each region-oriented descriptor. In steps 8510, ... 8590, each similarity measure is used in the making of a provisional decision on the similarity or dissimilarity of the two images. Thus, multiple provisional decisions are made, one for each region-oriented descriptor. Then, in step 8900, the multiple provisional decisions are used in the making of a final decision on the similarity or dissimilarity of the two images.

The aim of such a region-oriented parallel configuration as illustrated in FIG. 7 is to allow a more thorough exploration of the relationship between images $F_i$ and $F_j$ by processing similarity decisions arising from different regions of the images. Thus, such a system can provide final similarity decisions, provide information like "the images are very similar in certain regions, but dissimilar in other regions", and also identify relations between corresponding regions of different images. In contrast, a system where scale-specific channel-specific descriptors are fused into a single multi-scale-multi-channel descriptor can only provide a similarity decision for two images.

Thus, in one embodiment of the invention for the retrieval of images from a set of images that are similar to a given image $F_i$, a scheme as illustrated in FIG. 8 allows the retrieval of images that are partially similar to the query image, for example images of the same scene but with occlusions caused by a person suddenly walking into the optical field of the camera and obstructing the left part of the scene.

Similarly, in an alternative embodiment of the invention for the detection of frame discontinuities a system as illustrated in FIG. 8 not only reliably detects frame discontinuities, but also separates the shot transitions from other intra-shot disturbances, such as a person moving at speed close to the camera and briefly obstructing the field of view.

In FIG. 8, step 8100 is analogous to step 7100 of FIG. 7 and all methodologies, extensions and modifications described earlier for step 7100 apply here as well.

Similarly, step 8200 is analogous to step 7200 of FIG. 7 and all methodologies, extensions and modifications described earlier for step 7200 apply here as well.

Similarly, step 8250 is analogous to step 7250 of FIG. 7 and all methodologies, extensions and modifications described earlier for step 7250 apply here as well.

Similarly, steps 8410, . . . , 8490 are analogous to steps 7410, . . . , 7490 of FIG. 7 and all methodologies, extensions and modifications described earlier for steps 7410, . . . , 7490 apply here as well.

Similarly, steps 8510, . . . , 8590 are analogous to steps 7510, . . . , 7590 of FIG. 7 and all methodologies, extensions and modifications described earlier for steps 7510, . . . , 7590 apply here as well.

Similarly, step 8900 is analogous to step 8900 of FIG. 7 and all methodologies, extensions and modifications described earlier for step 8900 apply here as well.

It should be clearly understood that in a preferred embodiment of the invention, descriptors are extracted at many scales and across multiple channels. However, in alternative embodiments of the invention this need not be so. For example, for the realisation of a scale-oriented framework, descriptors may be extracted for a single colour channel and/or for a single image region. Similarly, for the realisation of a channel-oriented framework, descriptors may be extracted at a single scale and/or for a single image region. Similarly, for the realisation of a feature-semantics-oriented framework, descriptors may be extracted at a single scale and/or for a single channel and/or for a single image region. Similarly, for the realisation of a region-oriented framework, descriptors may be extracted at a single scale and/or for a single channel.

It should also be clearly understood that the serial and parallel configurations described herein are not exclusive to a particular descriptor split or orientation. Specific configurations are applied to specific descriptor orientations for illustrative purposes only. For example, the previous embodiments consider a serial configuration only for the scale-oriented descriptors. Alternative embodiments of the invention employ the serial configuration for the other descriptor orientations. For example, an alternative embodiment of the invention processes channel-oriented descriptors in a serial configuration, aiming in quickly filtering out images that are dissimilar to a given image in one of the channels, so that processing the other channels is not required. Yet another alternative embodiment of the invention processes feature-semantics-oriented descriptors in a serial configuration, with the same rationale as above. Yet another alternative embodiment of the invention processes region-oriented descriptors in a serial configuration, with the same rationale as above.

Figure 9:
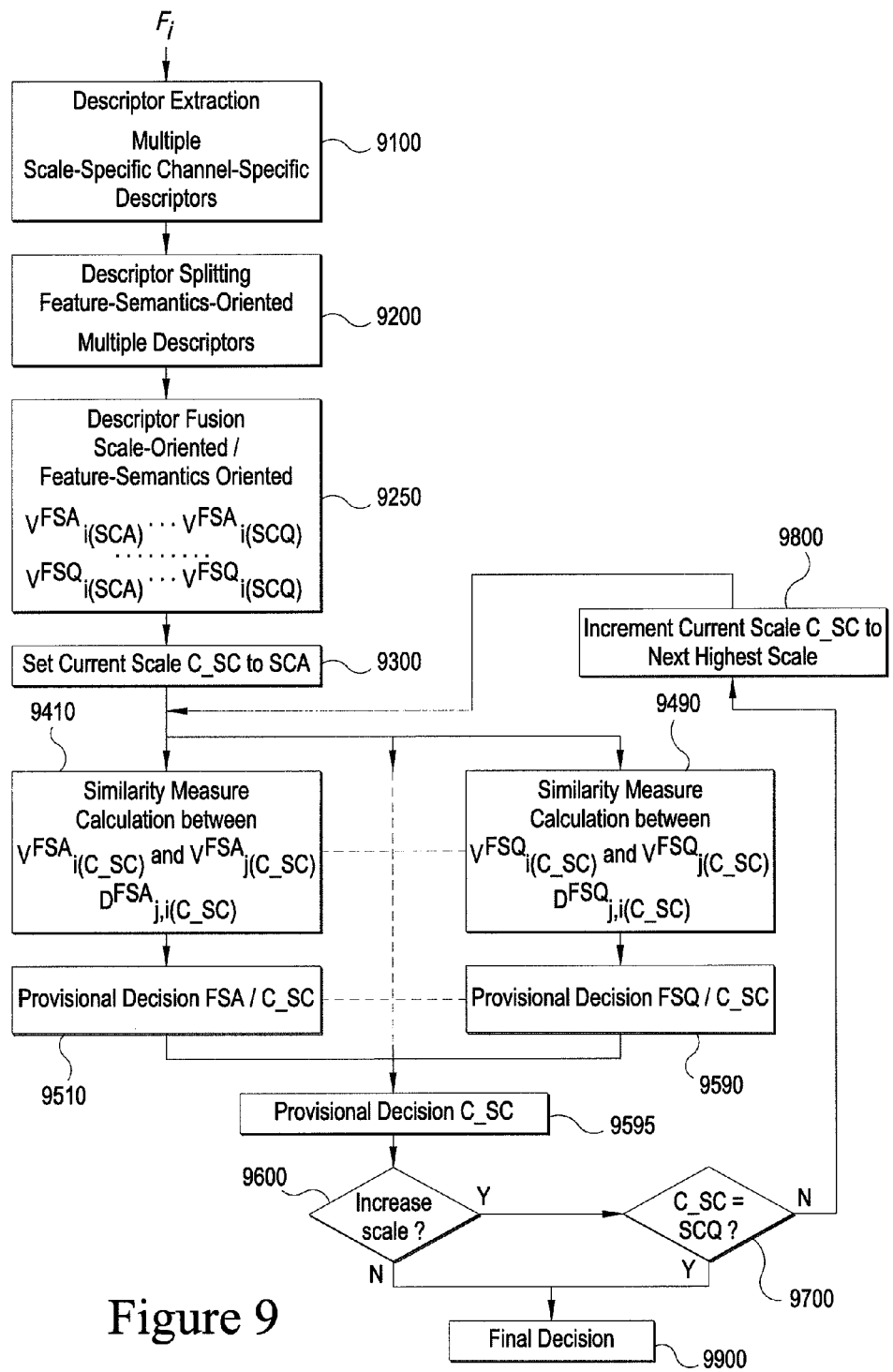
FIG. 9 is a flow diagram for comparing a plurality of images according to a further embodiment of the invention.

It should also be clearly understood that a system may rely on multiple descriptor orientations. For example, in one embodiment of the invention, and after the initial calculation of scale-specific channel-specific descriptors, scale-oriented feature-semantics-oriented descriptors are formed. For example, four descriptors are formed, i.e. one descriptor for the low scales of the colour content elements, one descriptor for the high scales of the colour content elements, one descriptor for the low scales of the colour interrelation elements, and one descriptor for the high scales of the colour interrelation elements. In one embodiment of the invention, such descriptors are processed in a parallel configuration as previously described. In another embodiment of the invention, such descriptors are processed in a serial configuration as previously described. In yet another embodiment of the invention, a hybrid configuration as illustrated in FIG. 9 is used. There, SCA and SCQ are the lowest and highest descriptor scales respectively and FSA, FSQ represent feature types.

The hybrid framework may also be utilised for a single descriptor orientation. For example, one alternative embodiment relies on a serial configuration whereby, at each loop, not a single but a small number of scale-oriented descriptors are processed in an embedded parallel configuration. Thus, it should also be clearly understood that different embodiments of the invention, regardless of whether they rely on a single or on multiple descriptor orientations, may rely on a serial configuration or a parallel configuration or a hybrid configuration. It should also be clearly understood that FIG. 9 shows just one possible hybrid configuration for illustrative purposes, whereby a parallel configuration is embedded within a serial configuration. Alternative embodiments employ other hybrid configurations, for example configurations where one or more serial configurations are embedded within a parallel configuration.

As shown in FIG. 9, images are initially processed at a staring coarse scale and, if a confident decision cannot be reached, they are then processed at the next finest scale and so on, until a confident decision is reached or the available/allowable scales are exhausted.

In a preferred embodiment, for each scale, there are four descriptors per image that are processed in parallel and their respective results combined to give a decision for that scale. This is similar to FIG. 9, but the descriptors used are as follows: (i) colour content extracted from luminance, (ii) colour interrelation extracted from luminance, (iii) colour content extracted from chrominance, and (iv) colour interrelation extracted from chrominance.

In an alternative, the two colour content descriptors (one for luminance and one for chrominance) are used for the starting scale only. For all other scales, only the two colour interrelation descriptors are used.

Furthermore, in the previous embodiments the processing of all pairs of consecutive frames was considered for the detection of frame discontinuities. Alternative embodiments may process frames more sparsely. An alternative embodiment processes only every $4^{th}$ frame, while yet another embodiment processes only every $16^{th}$ frame. Such enhancements further increase the speed of a video segmentation system.

Furthermore, the above descriptions relate to the processing of uncompressed digital video, where each frame is represented by its pixel values. The invention can also be applied directly to MPEG compressed video without decompression.

The nature of MPEG video is well known to those skilled in the art and is expertly described in the book Watkinson, J., "The MPEG Handbook: MPEG-1, MPEG-2, MPEG-4", Focal Press, Oxford 2001, ISBN:0-240-51656-7.

In one embodiment of the invention for MPEG compressed video, only the I frames of the video are processed. More specifically, only the DC representations of the I frames are processed, i.e. for each block of 8×8 pixels, only the DC component of its DCT transform is taken. In effect, the DC representation of an I frame is simply a resampled version of the original frame before its compression using 8×8 block averaging. Since DC components can be retrieved directly from the compressed video stream without decompression, it is evident that embodiments of the invention are directly applicable to the processing of the I frames of MPEG compressed video.

The invention can be implemented for example in a computer system, with suitable software and/or hardware modifications. For example, the invention can be implemented using a computer or similar device having control or processing means such as a processor or control device, data storage means, including image storage means, such as memory, magnetic storage, CD, DVD etc, data output means such as a display or monitor or printer, data input means such as a keyboard, and image input means such as a scanner, or any combination of such components together with additional components. Aspects of the invention can be provided in software and/or hardware form, or in an application-specific apparatus or application-specific modules can be provided, such as integrated circuits. Components of a system in an apparatus according to an embodiment of the invention may be provided remotely from other components, for example, over the internet.

Figure 10:
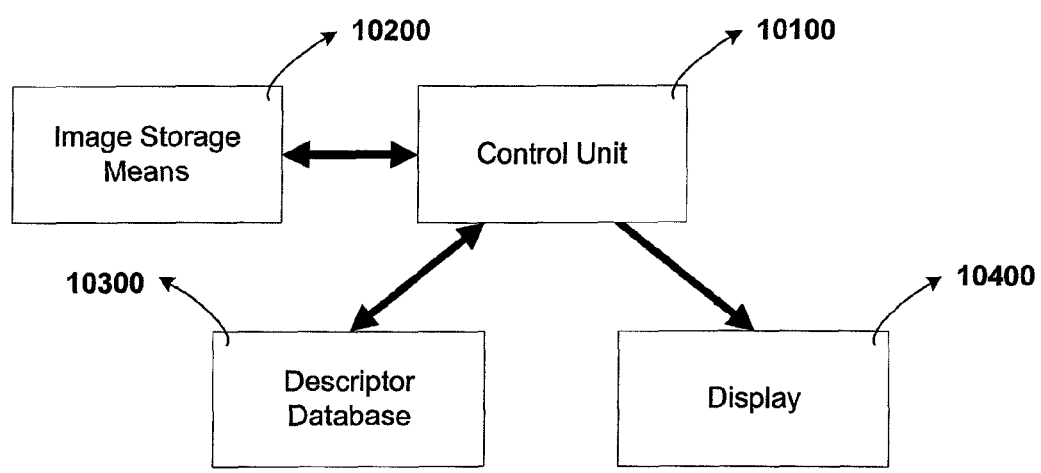
FIG. 10 is a schematic illustration of a processing device suitable for the implementation of embodiments of the invention.

A block diagram of a suitable apparatus in the form of a computer system is shown in FIG. 10 where a control unit 10100 is connected to an image storage means 10200, a descriptor storage means 10300 and a display 10400. The image storage device 10200 stores data corresponding to the images to be represented or compared according to the aforementioned embodiments. This may be data corresponding to a single image, a plurality of images, clusters of images, sequences of images or an entire image database. The descriptor storage means 10300, which may be a database, stores all derived descriptors including sub-descriptors calculated by the control unit 10100. Results of the operation of the control unit are displayed to a user on display 10400.

The terms "scale" and "resolution" are used interchangeably herein. A region of an image can mean the whole image or part of an image.

The term "descriptor" refers to a derived representation of an image or part of an image which may be used in a decision making process. The term "sub-descriptor" refers to a derived representation of an image or part of an image which is associated to form a descriptor. A person skilled in the art will realise however that the distinction is merely one of convenience and each term refers to a particular point in the described methods. Each sub-descriptor of a particular embodiment may act as a descriptor in a different embodiment, and vice versa. Therefore, only the term descriptor is used in the specific embodiments.

What is claimed:

1. A method of representing at least one image, using one or more processors, comprising:
    deriving, using one or more processors, a plurality of first sub-descriptors representing colour information for a plurality of first windows of said image and a plurality of second sub-descriptors representing colour interrelation information for a plurality of second windows of said image, wherein said first windows comprise windows defined in different sizes.

2. The method of claim 1 further comprising
    producing a reduced image of size 32×32 pixels corresponds to said image,
    wherein said reduced image is used for said process of deriving the first and second sub-descriptors.

3. The method of claim 1 wherein said second windows comprise windows overlapping each other and windows which do not overlap each other.

4. The method of claim 1 wherein different neighbourhood parameters or sub-descriptor extraction processes are employed at different locations in said image.

5. The method of claim 1 wherein different processes for deriving sub-descriptors are used for different regions.

6. The method of claim 1 wherein at least one sub-descriptor element for a region, or each or all of a plurality of sub-descriptor elements for a region, is or are derived using only a subset of pixels in said region.

7. The method of claim 1 further comprising associating a plurality of second sub-descriptors or sub-descriptor elements are associated on the basis of one or more of colour interrelation.

8. The method of claim 1 wherein all the descriptor elements are derived for a single colour channel.

9. The method of claim 1 using colour space YCrCb.

10. The method of claim 1 comprising deriving descriptor elements for luminance channel Y.

11. The method of claim 1 wherein colour is derived from averages of pixel values of said first windows and colour interrelation is derived from differences based on pixel values of said second windows.

12. A method of representing a group of images using one or more processors, comprising
    deriving a representation of each image using a method of claim 1; and
    using said representations to represent said group of images, comprising deriving, using one or more processors, a function of said representations to represent the group of images, wherein said function includes a statistical measure.

13. A method of comparing images or groups of images using one or more processors comprising
    comparing, using one or more processors, respective representations derived using the method of claim 1, wherein the comparison involves comparing descriptors which correspond according to characteristics.

14. A method of comparing images or groups of images using one or more processors comprising
    comparing, using one or more processors, respective representations derived using a method of claim 1, wherein the comparison involves comparing descriptors which correspond according to characteristics.

15. An apparatus of representing at least one image comprising:
    a memory; and
    one or more processors configured to perform processes including deriving a plurality of first sub-descriptors representing colour information for a plurality of first windows of said image and a plurality of second sub-descriptors representing colour interrelation information for a plurality of a second windows of said image,
    wherein said first windows comprise windows defined in different sizes.

16. An apparatus of representing a group of images comprising:
    a memory; and
    one or more processors configured to perform processes including
    deriving a representation of each image using an apparatus of claim 15, and using said representations to represent said group of images, comprising deriving a function of said representations to represent the group of images for example, wherein said function comprises a statistical measure such as average, median, mean, covariance or the like.

17. An apparatus of comparing images and/or groups of images comprising:
    a descriptor database storing descriptors of images or groups of images; and
    one or more processors configured to perform processes including
        comparing respective representations derived using an apparatus of claim 15,
    wherein the comparison involves comparing descriptors which correspond according to characteristics.

18. An apparatus of comparing images and/or groups of images comprising:
    a descriptor database storing descriptors of images or groups of images; and
    one or more processors configured to perform processes including
        comparing respective representations derived using an apparatus of claim 16,
    wherein the comparison involves comparing descriptors which correspond according to characteristics.

* * * * *